United States Patent
Jiang et al.

(10) Patent No.: US 10,257,751 B2
(45) Date of Patent: Apr. 9, 2019

(54) USER EQUIPMENT AND CIRCUIT SWITCHED FALLBACK SWITCHING METHOD

(71) Applicant: HUAWEI TECHNOLOGIES CO., LTD., Guangdong (CN)

(72) Inventors: Yinqing Jiang, Wuhan (CN); Xiaoyan Chen, Wuhan (CN); Xiaojian Liu, Wuhan (CN); Li Shen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 83 days.

(21) Appl. No.: 15/316,059

(22) PCT Filed: Jul. 22, 2014

(86) PCT No.: PCT/CN2014/082732
§ 371 (c)(1),
(2) Date: Dec. 2, 2016

(87) PCT Pub. No.: WO2016/011603
PCT Pub. Date: Jan. 28, 2016

(65) Prior Publication Data
US 2017/0105147 A1 Apr. 13, 2017

(51) Int. Cl.
*H04W 36/00* (2009.01)
*H04W 76/10* (2018.01)
(Continued)

(52) U.S. Cl.
CPC ...... *H04W 36/0022* (2013.01); *H04B 17/318* (2015.01); *H04W 36/00* (2013.01);
(Continued)

(58) Field of Classification Search
CPC . H04W 36/0022; H04W 36/36; H04W 48/18; H04W 36/14; H04W 36/08; H04W 76/10; H04W 36/00; H04B 17/318
See application file for complete search history.

(56) References Cited

U.S. PATENT DOCUMENTS

2010/0317315 A1 12/2010 Burbidge et al.
2011/0014919 A1 1/2011 Otte et al.
(Continued)

FOREIGN PATENT DOCUMENTS

| CN | 101867986 A | 10/2010 |
|---|---|---|
| CN | 103167564 A | 6/2013 |

(Continued)

OTHER PUBLICATIONS

International Search Report dated Apr. 27, 2015 in PCT/CN2014/082732 (with English Translation).
(Continued)

*Primary Examiner* — Ian N Moore
*Assistant Examiner* — Justin T Van Roie
(74) *Attorney, Agent, or Firm* — Oblon, McClelland, Maier & Neustadt, L.L.P.

(57) ABSTRACT

Embodiments of the present invention relate to the field of wireless communications technologies, and provide a switching method. The method specifically includes: when user equipment is in idle mode, acquiring a 2G/3G base station candidate set; when initiating a voice service, sending a CSFB request message to an LTE base station; receiving a standard and a frequency of a target 2G/3G base station that are sent by the LTE base station to the user equipment; determining, according to the standard and the frequency of the target 2G/3G base station, whether the 2G/3G base station candidate set includes the target 2G/3G base station; and if the 2G/3G base station candidate set (Continued)

includes the target 2G/3G base station, switching, from the LTE base station to the target 2G/3G base station according to the standard and the frequency of the target 2G/3G base station.

17 Claims, 8 Drawing Sheets

(51) Int. Cl.
*H04W 36/14* (2009.01)
*H04B 17/318* (2015.01)
*H04W 36/08* (2009.01)
*H04W 36/36* (2009.01)
*H04W 48/18* (2009.01)

(52) U.S. Cl.
CPC .......... *H04W 36/08* (2013.01); *H04W 36/14* (2013.01); *H04W 36/36* (2013.01); *H04W 48/18* (2013.01); *H04W 76/10* (2018.02)

(56) References Cited

U.S. PATENT DOCUMENTS

| 2011/0171915 A1* | 7/2011 | Gomes ................. H04W 24/10 455/73 |
| 2011/0199950 A1 | 8/2011 | Klingenbrunn et al. |
| 2012/0178455 A1 | 7/2012 | Sato |
| 2013/0051362 A1 | 2/2013 | Lee et al. |
| 2013/0183981 A1* | 7/2013 | Singh ................ H04W 36/0016 455/437 |
| 2014/0113636 A1 | 4/2014 | Lee et al. |
| 2015/0215771 A1 | 7/2015 | Ranke et al. |

FOREIGN PATENT DOCUMENTS

| CN | 103476073 A | 12/2013 |
| CN | 103702378 A | 4/2014 |
| JP | 2011077635 A | 4/2011 |
| JP | 2012175539 A | 9/2012 |
| JP | 2012533939 A | 12/2012 |
| JP | 2013520109 A | 5/2013 |
| JP | 2014011494 A | 1/2014 |
| WO | 2013012371 A1 | 1/2013 |
| WO | WO 2014/029409 A1 | 2/2014 |
| WO | WO 2014/107054 A1 | 7/2014 |

OTHER PUBLICATIONS

Extended European Search Report dated Apr. 12, 2017 in Patent Application No. 14898271.3.
Korean Office Action dated Dec. 14, 2017 in Korean Patent Application No. 10-2016-7035548 (with English translation), 10 pages.
Japanese Office Action dated Dec. 22, 2017 in Japanese Patent Application No. 2017-519753, 3 pages.
Combined Office Action and Search Report dated May 9, 2018 in Chinese Patent Application No. 201480046580.6 (with English translation of categories of cited documents) citing U.S. Patent Application Publication No. 1 therein, 6 pages.

* cited by examiner

USER EQUIPMENT AND CIRCUIT SWITCHED FALLBACK SWITCHING METHOD

CROSS-REFERENCE TO RELATED APPLICATIONS

This application is a national stage of International Application No. PCT/CN2014/082732, filed on Jul. 22, 2014, which is hereby incorporated by reference in its entirety.

TECHNICAL FIELD

The present disclosure relates to the field of wireless communications technologies, and in particular, to user equipment and a circuit switched fallback switching method.

BACKGROUND

To make up for a deficiency, in the aspect of voice call, of an LTE (Long Term Evolution) network, in the prior art, within a range of overlapping coverage between the LTE network and a 2G (2-Generation Wireless Telephone Technology, LTE generation mobile phone communications technology specification)/3G (3rd-Generation, 3rd generation mobile communications technology) network, a voice service of a user of the LTE network is switched to the 2G/3G network by using a CSFB (Circuit Switched Fallback) technology, to improve voice call quality.

According to a CSFB switching method provided in the prior art, in a switching process, user equipment needs to initiate a CSFB switching request message to an LTE base station when initiating a voice service, the LTE base station delivers a connection manner and a frequency of a target 2G/3G base station to the user equipment according to the switching request message, and after detecting the target 2G/3G base station according to the connection manner and the frequency of the target 2G/3G base station, the user equipment connects to the target 2G/3G base station, so as to switch the voice service that is to be enabled from the LTE network to the 2G/3G network. After the voice service is ended, when the user equipment is in idle mode, the user equipment is switched back from the 2G/3G network to the previous LTE network.

However, when a voice service is switched by using the CSFB switching method, one case is that, when user equipment cannot detect a target 2G/3G base station, the user equipment repeatedly performs the detection until a target 2G/3G base station is detected, and then connects to the target 2G/3G base station. As a result, there is a relatively long delay when the voice service is initiated. The other case is that, when a target 2G/3G base station cannot be detected, the voice service is interrupted. In both cases, reliability of voice service switching is reduced.

SUMMARY

To resolve a problem in the prior art, embodiments of the present disclosure provide user equipment and a circuit switched fallback switching method. The technical solutions are as follows:

According to a first aspect, user equipment is provided, where the user equipment includes:

an acquiring unit, configured to: when the user equipment is in idle mode, acquire a 2nd/3rd generation mobile phone communications technology specification 2G/3G base station candidate set, where the 2G/3G base station candidate set includes a standard and a frequency that correspond to a 2G/3G base station, the 2G/3G base station belongs to a 2G/3G network, and a signal strength of the 2G/3G base station is greater than a preset threshold;

a sending unit, configured to: when the user equipment initiates, in a Long Term Evolution LTE network, a voice service, send, by the user equipment, a circuit switched fallback CSFB request message to an LTE base station, where the LTE base station is a base station currently connected to the user equipment, the LTE base station belongs to the LTE network, and the CSFB request message includes a standard and a frequency of a target 2G/3G base station;

a receiving unit, configured to receive the standard and the frequency of the target 2G/3G base station that are sent by the LTE base station to the user equipment;

a determining unit, configured to determine, according to the standard and the frequency of the target 2G/3G base station, whether the 2G/3G base station candidate set includes the target 2G/3G base station; and a switching unit, configured to: when the 2G/3G base station candidate set includes the target 2G/3G base station, switch from the LTE base station to the target 2G/3G base station according to the standard and the frequency of the target 2G/3G base station.

With reference to the first aspect, in a first possible implementation manner, the acquiring unit includes:

a first acquiring subunit, configured to detect the signal strength of the received base station in the 2G/3G network, and acquire the standard and the frequency of the 2G/3G base station, where the signal strength of the 2G/3G base station is greater than the preset threshold; and a second acquiring subunit, configured to receive the 2G/3G base station candidate set according to the 2G/3G base station and the standard and the frequency that correspond to the 2G/3G base station.

With reference to the first possible implementation manner of the first aspect, in a second possible implementation manner, the first acquiring subunit is specifically configured to receive, by the user equipment, by detecting a broadcast control channel of the 2G/3G base station, a standard and a frequency that the 2G/3G base station loads onto the broadcast control channel; and the second acquiring subunit is specifically configured to generate the 2G/3G base station candidate set according to the 2G/3G base station and the standard and the frequency that correspond to the 2G/3G base station; or the second acquiring subunit is specifically configured to:

send the 2G/3G base station and the standard and the frequency that correspond to the 2G/3G base station to a server; and receive the 2G/3G base station candidate set sent by the server.

With reference to any one of the first aspect to the second possible implementation manner of the first aspect, in a third possible implementation manner, if the 2G/3G base station candidate set does not include the target 2G/3G base station, the sending unit is further configured to send a resending request message to the LTE base station, where the resending request message is used to indicate to the LTE base station that the 2G/3G base station candidate set does not include the target 2G/3G base station; and after the LTE base station re-determines a target 2G/3G base station, and sends a standard and a frequency of the re-determined target 2G/3G base station to the user equipment, the determining unit is further configured to determine whether the 2G/3G base station candidate set includes the re-determined target 2G/3G base station, and if the 2G/3G base station candidate set does not include the re-determined target 2G/3G base station, trigger the sending unit to continue to perform the step of sending a resending request message to the LTE base station.

With reference to the first aspect, in a fourth possible implementation manner, the acquiring unit is further configured to acquire, in descending order of signal strengths in the 2G/3G base station candidate set, a 2G/3G base station with a maximum signal strength in the 2G/3G base station candidate set; and the switching unit is further configured to switch the user equipment to the 2G/3G base station according to a standard and a frequency of the 2G/3G base station.

With reference to the fourth possible implementation manner of the first aspect, in a fifth possible implementation manner, the determining unit is further configured to determine whether the 2G/3G base station is the target 2G/3G base station, and if the 2G/3G base station is the target 2G/3G base station, the switching unit continues to connect to the target 2G/3G base station; or if the 2G/3G base station is not the target 2G/3G base station, the switching unit is further configured to switch from the target 2G/3G base station to the 2G/3G base station.

With reference to the first aspect, in a sixth possible implementation manner, the receiving unit is further configured to: before the voice service is initiated, receive a system message sent by the LTE base station, where the system message includes a record of a connection to the user equipment and standards and frequencies of all 2G/3G base stations at a current location of the user equipment, and the connection record includes standards and frequencies of all 2G/3G base stations to which the user equipment has connected;

the determining unit is further configured to determine, by the user equipment, whether the connection record includes a 2G/3G base station at the current location of the user equipment; and if the connection record includes the 2G/3G base station at the current location of the user equipment, the acquiring unit is further configured to determine that a 2G/3G base station to which the user equipment has connected at the current location is the target 2G/3G base station; or if the connection record does not include the 2G/3G base station at the current location of the user equipment, the acquiring unit is further configured to determine, in descending order of signal strengths of all the 2G/3G base stations at the current location, that a 2G/3G base station with a maximum signal strength in all the 2G/3G base stations is the 2G/3G base station.

With reference to the first aspect, in a seventh possible implementation manner, the determining unit is further configured to determine whether the user equipment is in idle mode;

the sending unit is further configured to: if the user equipment is not in idle mode, send a mode switching request message to a 2G/3G base station, where the 2G/3G base station is a base station currently connected to the user equipment, and the 2G/3G base station belongs to the 2G/3G network;

the receiving unit is further configured to receive a mode switching instruction sent by the 2G/3G base station;

the switching unit is further configured to switch to the idle mode according to the mode switching instruction;

the acquiring unit is further configured to acquire an LTE base station candidate set, where the LTE base station candidate set includes a standard and a frequency that correspond to the LTE base station, the LTE base station belongs to the LTE network, and a signal strength of the LTE base station is greater than the preset threshold;

the acquiring unit is further configured to acquire, from the LTE base station candidate set, a target LTE base station to be switched to; and the switching unit is further configured to switch from the 2G/3G base station to the target LTE base station according to a standard and a frequency of the target LTE base station.

With reference to the seventh possible implementation manner of the first aspect, in an eighth possible implementation manner, the first acquiring subunit is further configured to detect the signal strength of the received base station in the LTE network, and acquire the standard and the frequency of the LTE base station, where the signal strength of the LTE base station is greater than the preset threshold; and the second acquiring subunit is further configured to receive the LTE base station candidate set according to the LTE base station and the standard and the frequency that correspond to the LTE base station.

With reference to the eighth possible implementation manner of the first aspect, in a ninth possible implementation manner, the first acquiring subunit is specifically configured to receive, by detecting a broadcast control channel of the LTE base station, a standard and a frequency that the LTE base station loads onto the broadcast control channel; and the second acquiring subunit is specifically configured to generate the LTE base station candidate set according to the LTE base station and the standard and the frequency that correspond to the LTE base station; or the second acquiring subunit is specifically configured to:

send the LTE base station and the standard and the frequency that correspond to the LTE base station to a server; and receive the 2G/3G base station candidate set sent by the server.

With reference to the eighth or the ninth possible implementation manner of the first aspect, in a tenth possible implementation manner, the third acquiring subunit is further configured to determine, in descending order of signal strengths in the LTE base station candidate set, that an LTE base station with a maximum signal strength in the LTE base station candidate set is the target LTE base station.

According to a second aspect, a circuit switched fallback switching method is provided, where the method includes:

when user equipment is in idle mode, acquiring a 2nd/3rd generation mobile phone communications technology specification 2G/3G base station candidate set, where the 2G/3G base station candidate set includes a standard and a frequency that correspond to a 2G/3G base station, the 2G/3G base station belongs to a 2G/3G network, and a signal strength of the 2G/3G base station is greater than a preset threshold;

when the user equipment initiates, in a Long Term Evolution LTE network, a voice service, sending, by the user equipment, a circuit switched fallback CSFB request message to an LTE base station, where the LTE base station is a base station currently connected to the user equipment, the LTE base station belongs to the LTE network, and the CSFB request message includes a target 2G/3G standard and frequency of a target 2G/3G base station;

receiving, by the user equipment, the standard and the frequency of the target 2G/3G base station that are sent by the LTE base station to the user equipment;

determining, by the user equipment according to the standard and the frequency of the target 2G/3G base station, whether the 2G/3G base station candidate set includes the target 2G/3G base station; and if the 2G/3G base station candidate set includes the target 2G/3G base station, switching, by the user equipment, from the LTE base station to the target 2G/3G base station according to the standard and the frequency of the target 2G/3G base station.

With reference to the second aspect, in a first possible implementation manner, the acquiring, by the user equipment, a 2G/3G base station candidate set includes:

detecting, by the user equipment, the signal strength of the received base station in the 2G/3G network, and acquiring the standard and the frequency of the 2G/3G base station, where the signal strength of the 2G/3G base station is greater than the preset threshold; and receiving, by the user equipment, the 2G/3G base station candidate set according to the 2G/3G base station and the standard and the frequency that correspond to the 2G/3G base station.

With reference to the first possible implementation manner of the second aspect, in a second possible implementation manner, the receiving the standard and the frequency of the 2G/3G base station includes:

receiving, by the user equipment, by detecting a broadcast control channel of the 2G/3G base station, a standard and a frequency that the 2G/3G base station loads onto the broadcast control channel; and the acquiring the 2G/3G base station candidate set includes:

generating, by the user equipment, the 2G/3G base station candidate set according to the 2G/3G base station and the standard and the frequency that correspond to the 2G/3G base station; or sending, by the user equipment, the 2G/3G base station and the standard and the frequency that correspond to the 2G/3G base station to a server; and receiving, by the user equipment, the 2G/3G base station candidate set sent by the server.

With reference to any one of the second aspect to the second possible implementation manner of a third aspect, in a third possible implementation manner, the method further includes:

if the 2G/3G base station candidate set does not include the target 2G/3G base station, sending, by the user equipment, a resending request message to the LTE base station, where the resending request message is used to indicate to the LTE base station that the 2G/3G base station candidate set does not include the target 2G/3G base station; and after the LTE base station re-determines a target 2G/3G base station, and sends a standard and a frequency of the re-determined target 2G/3G base station to the user equipment, determining, by the user equipment, whether the 2G/3G base station candidate set includes the re-determined target 2G/3G base station, and if the 2G/3G base station candidate set does not include the re-determined target 2G/3G base station, continuing, by the user equipment, to perform the step of sending a resending request message to the LTE base station.

With reference to the second aspect, in a fourth possible implementation manner, after the switching, by the user equipment, from the LTE base station to the target 2G/3G base station according to the standard and the frequency of the target 2G/3G base station, the method further includes:

acquiring, by the user equipment, in descending order of signal strengths in the 2G/3G base station candidate set, a 2G/3G base station with a maximum signal strength in the 2G/3G base station candidate set; and switching, by the user equipment, the user equipment to the 2G/3G base station according to a standard and a frequency of the 2G/3G base station.

With reference to the fourth possible implementation manner of the second aspect, in a fifth possible implementation manner, the switching, by the user equipment, the user equipment to the 2G/3G base station according to a standard and a frequency of the 2G/3G base station includes:

determining, by the user equipment, whether the 2G/3G base station is the target 2G/3G base station, and if the 2G/3G base station is the target 2G/3G base station, continuing to connect, by the user equipment, to the target 2G/3G base station; or if the 2G/3G base station is not the target 2G/3G base station, switching, by the user equipment, from the target 2G/3G base station to the 2G/3G base station.

With reference to the second aspect, in a sixth possible implementation manner, before initiating the voice service, receiving, by the user equipment, a system message sent by the LTE base station, where the system message includes a record of a connection to the user equipment and standards and frequencies of all 2G/3G base stations at a current location of the user equipment, and the connection record includes standards and frequencies of all 2G/3G base stations to which the user equipment has connected;

determining, by the user equipment, whether the connection record includes a 2G/3G base station at the current location of the user equipment; and if the connection record includes the 2G/3G base station at the current location of the user equipment, determining, by the user equipment, that a 2G/3G base station to which the user equipment has connected at the current location is the target 2G/3G base station; or if the connection record does not include the 2G/3G base station at the current location of the user equipment, determining, by the user equipment, in descending order of signal strengths of all the 2G/3G base stations at the current location, that a 2G/3G base station with a maximum signal strength in all the 2G/3G base stations is the target 2G/3G base station.

With reference to the second aspect, in a seventh possible implementation manner, after the user equipment ends a voice service in the 2G/3G network, the method further includes:

determining, by the user equipment, whether the user equipment is in idle mode;

if the user equipment is not in idle mode, sending, by the user equipment, a mode switching request message to a 2G/3G base station, where the 2G/3G base station is a base station currently connected to the user equipment, and the 2G/3G base station belongs to the 2G/3G network;

receiving, by the user equipment, a mode switching instruction sent by the 2G/3G base station; and switching, by the user equipment, to the idle mode according to the mode switching instruction; or when the user equipment is in idle mode, acquiring an LTE base station candidate set, where the LTE base station candidate set includes a standard and a frequency that correspond to the LTE base station, the LTE base station belongs to the LTE network, and a signal strength of the LTE base station is greater than the preset threshold; and acquiring, by the user equipment, from the LTE base station candidate set, a target LTE base station to be switched to, and switching from the 2G/3G base station to the target LTE base station according to a standard and a frequency of the target LTE base station.

With reference to the seventh possible implementation manner of the second aspect, in an eighth possible implementation manner, the acquiring, by the user equipment, an LTE base station candidate set includes:

detecting, by the user equipment, the signal strength of the received base station in the LTE network, and acquiring the standard and the frequency of the LTE base station, where the signal strength of the LTE base station is greater than the preset threshold; and receiving, by the user equipment, the LTE base station candidate set according to the LTE base station and the standard and the frequency that correspond to the LTE base station.

With reference to the eighth possible implementation manner of the second aspect, in a ninth possible implementation manner, the receiving the standard and the frequency of the LTE base station includes:

receiving, by the user equipment, by detecting a broadcast control channel of the LTE base station, a standard and a frequency that the LTE base station loads onto the broadcast control channel; and the acquiring the LTE base station candidate set includes:

generating, by the user equipment, the LTE base station candidate set according to the LTE base station and the standard and the frequency that correspond to the LTE base station; or sending, by the user equipment, the LTE base station and the standard and the frequency that correspond to the LTE base station to a server; and receiving, by the user equipment, the LTE base station candidate set sent by the server.

With reference to the eighth or the ninth possible implementation manner of the second aspect, in a tenth possible implementation manner, the acquiring, from the LTE base station candidate set, a target LTE base station includes:

determining, by the user equipment, in descending order of signal strengths in the LTE base station candidate set, that an LTE base station with a maximum signal strength in the LTE base station candidate set is the target LTE base station.

According to a third aspect, user equipment is provided, where the user equipment includes: a transmit unit, a receiving unit, a memory, and a processor that is separately connected to the transmit unit, the receiving unit, and the memory, where a set of program code is stored in the memory, and the processor is configured to invoke the program code stored in the memory, to perform the following operations:

when user equipment is in idle mode, acquiring a 2nd/3rd generation mobile phone communications technology specification 2G/3G base station candidate set, where the 2G/3G base station candidate set includes a standard and a frequency that correspond to a 2G/3G base station, the 2G/3G base station belongs to a 2G/3G network, and a signal strength of the 2G/3G base station is greater than a preset threshold;

when the user equipment initiates, in an LTE network, a voice service, sending, by the user equipment, a circuit switched fallback CSFB request message to a Long Term Evolution LTE base station, where the LTE base station is a base station currently connected to the user equipment, the LTE base station belongs to the LTE network, and the CSFB request message includes a standard and a frequency of a target 2G/3G base station;

receiving, by the user equipment, the standard and the frequency of the target 2G/3G base station that are sent by the LTE base station to the user equipment;

determining, by the user equipment according to the standard and the frequency of the target 2G/3G base station, whether the 2G/3G base station candidate set includes the target 2G/3G base station; and if the 2G/3G base station candidate set includes the target 2G/3G base station, switching, by the user equipment, from the LTE base station to the target 2G/3G base station according to the standard and the frequency of the target 2G/3G base station.

With reference to the third aspect, in a first possible implementation manner, the processor is configured to invoke the program code stored in the memory, to further perform the following operations:

detecting, by the user equipment, the signal strength of the received base station in the 2G/3G network, and acquiring the standard and the frequency of the 2G/3G base station, where the signal strength of the 2G/3G base station is greater than the preset threshold; and receiving, by the user equipment, the 2G/3G base station candidate set according to the 2G/3G base station and the standard and the frequency that correspond to the 2G/3G base station.

With reference to the third aspect, in a second possible implementation manner, the processor is configured to invoke the program code stored in the memory, to further perform the following operations:

if the 2G/3G base station candidate set does not include the target 2G/3G base station, sending, by the user equipment, a resending request message to the LTE base station, where the resending request message is used to indicate to the LTE base station that the 2G/3G base station candidate set does not include the target 2G/3G base station; and after the LTE base station re-determines a target 2G/3G base station, and sends a standard and a frequency of the re-determined target 2G/3G base station to the user equipment, determining, by the user equipment, whether the 2G/3G base station candidate set includes the re-determined target 2G/3G base station, and if the 2G/3G base station candidate set does not include the re-determined target 2G/3G base station, continuing, by the user equipment, to perform the step of sending a resending request message to the LTE base station.

With reference to the third aspect, in a third possible implementation manner, the processor is configured to invoke the program code stored in the memory, to further perform the following operations:

acquiring, by the user equipment, in descending order of signal strengths in the 2G/3G base station candidate set, a 2G/3G base station with a maximum signal strength in the 2G/3G base station candidate set; and switching, by the user equipment, the user equipment to the 2G/3G base station according to a standard and a frequency of the 2G/3G base station.

With reference to the third possible implementation manner of the third aspect, in a fourth possible implementation manner, the processor is configured to invoke the program code stored in the memory, to further perform the following operations:

determining, by the user equipment, whether the 2G/3G base station is the target 2G/3G base station, and if the 2G/3G base station is the target 2G/3G base station, continuing to connect, by the user equipment, to the target 2G/3G base station; or if the 2G/3G base station is not the target 2G/3G base station, switching, by the user equipment, from the target 2G/3G base station to the 2G/3G base station.

With reference to the third aspect, in a fifth possible implementation manner, the processor is configured to invoke the program code stored in the memory, to further perform the following operations:

determining, by the user equipment, whether the user equipment is in idle mode;

if the user equipment is not in idle mode, sending, by the user equipment, a mode switching request message to a 2G/3G base station, where the 2G/3G base station is a base station currently connected to the user equipment, and the 2G/3G base station belongs to the 2G/3G network;

receiving, by the user equipment, a mode switching instruction sent by the 2G/3G base station; and switching, by the user equipment, to the idle mode according to the mode switching instruction; or when the user equipment is in idle mode, acquiring an LTE base station candidate set, where the LTE base station candidate set includes a standard and a frequency that correspond to the LTE base station, the LTE base station belongs to the LTE network, and a signal strength of the LTE base station is greater than the preset threshold; and acquiring, by the user equipment, from the LTE base station candidate set, a target LTE base station to be switched to, and switching from the 2G/3G base station to the target LTE base station according to a standard and a frequency of the target LTE base station.

With reference to the fifth possible implementation manner of the third aspect, in a sixth possible implementation manner, the processor is configured to invoke the program code stored in the memory, to further perform the following operations:

detecting, by the user equipment, the signal strength of the received base station in the LTE network, and acquiring the standard and the frequency of the LTE base station, where the signal strength of the LTE base station is greater than the preset threshold; and receiving, by the user equipment, the LTE base station candidate set according to the LTE base station and the standard and the frequency that correspond to the LTE base station.

With reference to the sixth possible implementation manner of the third aspect, in a seventh possible implementation manner, the processor is configured to invoke the program code stored in the memory, to further perform the following operations:

determining, by the user equipment, in descending order of signal strengths in the LTE base station candidate set, that an LTE base station with a maximum signal strength in the LTE base station candidate set is the target LTE base station.

The embodiments of the present disclosure provide user equipment and a circuit switched fallback switching method. When user equipment is in idle mode, a 2G/3G base station candidate set is acquired; when initiating a voice service, the user equipment sends a CSFB request message to an LTE base station; the user equipment receives a standard and a frequency of a target 2G/3G base station that are sent by the LTE base station to the user equipment; the user equipment determines, according to the standard and the frequency of the target 2G/3G base station, whether the 2G/3G base station candidate set includes the target 2G/3G base station; and if the 2G/3G base station candidate set includes the target 2G/3G base station, the user equipment switches from the LTE base station to the target 2G/3G base station according to the standard and the frequency of the target 2G/3G base station. It is determined that a target 2G/3G base station to which a user is to switch is a base station in a 2G/3G base station candidate set that has been acquired in advance, so that repeated detection of a target 2G/3G base station is avoided, a delay when a voice service is initiated is reduced, and reliability of the voice service is improved.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
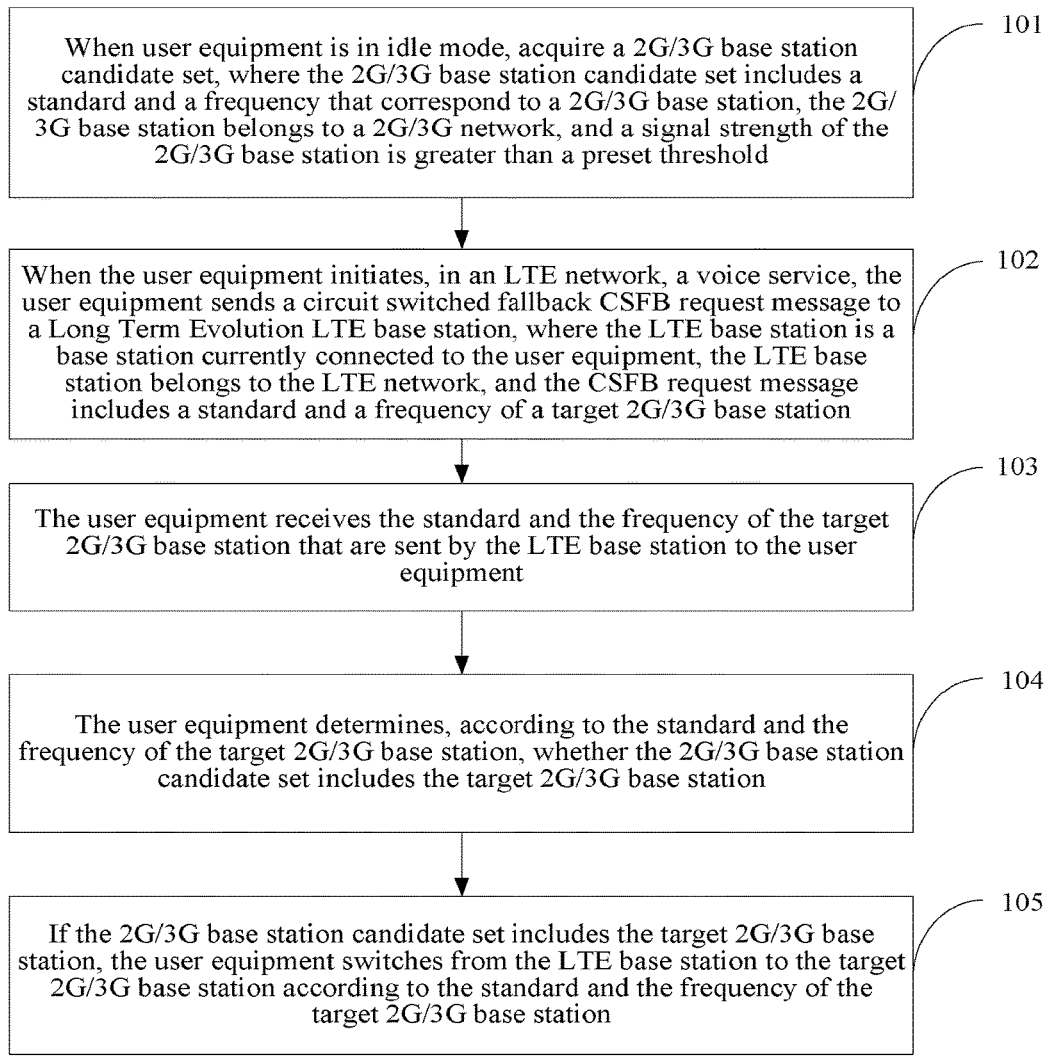
FIG. 1 is a flowchart of a circuit switched fallback switching method according to an embodiment of the present disclosure.

Embodiment 1 is a circuit switched fallback switching method provided in an embodiment of the present disclosure. The method is applied when a voice service is initiated. When user equipment initiates a voice service, the user equipment may be a calling party, or may be a called party, where an idle mode is a mode when the user equipment does not establish an RRC (Radio Resource Control) connection to a network side. As shown in FIG. 1, the method includes:

101: When user equipment is in idle mode, acquire a 2G/3G base station candidate set, where the 2G/3G base station candidate set includes a standard and a frequency that correspond to a 2G/3G base station, the 2G/3G base station belongs to a 2G/3G network, and a signal strength of the 2G/3G base station is greater than a preset threshold.

102: When the user equipment initiates, in an LTE network, a voice service, the user equipment sends a circuit switched fallback CSFB request message to a Long Term Evolution LTE base station, where the LTE base station is a base station currently connected to the user equipment, the LTE base station belongs to the LTE network, and the CSFB request message includes a standard and a frequency of a target 2G/3G base station.

103: The user equipment receives the standard and the frequency of the target 2G/3G base station that are sent by the LTE base station to the user equipment.

104: The user equipment determines, according to the standard and the frequency of the target 2G/3G base station, whether the 2G/3G base station candidate set includes the target 2G/3G base station.

105: If the 2G/3G base station candidate set includes the target 2G/3G base station, the user equipment switches from the LTE base station to the target 2G/3G base station according to the standard and the frequency of the target 2G/3G base station.

This embodiment of the present disclosure provides a switching method. It is determined that a target 2G/3G base station to which a user is to switch is a base station in a 2G/3G base station candidate set that has been acquired in advance, so that repeated detection of a target 2G/3G base station is avoided, a delay when a voice service is initiated is reduced, and reliability of the voice service is improved.

Figure 2:
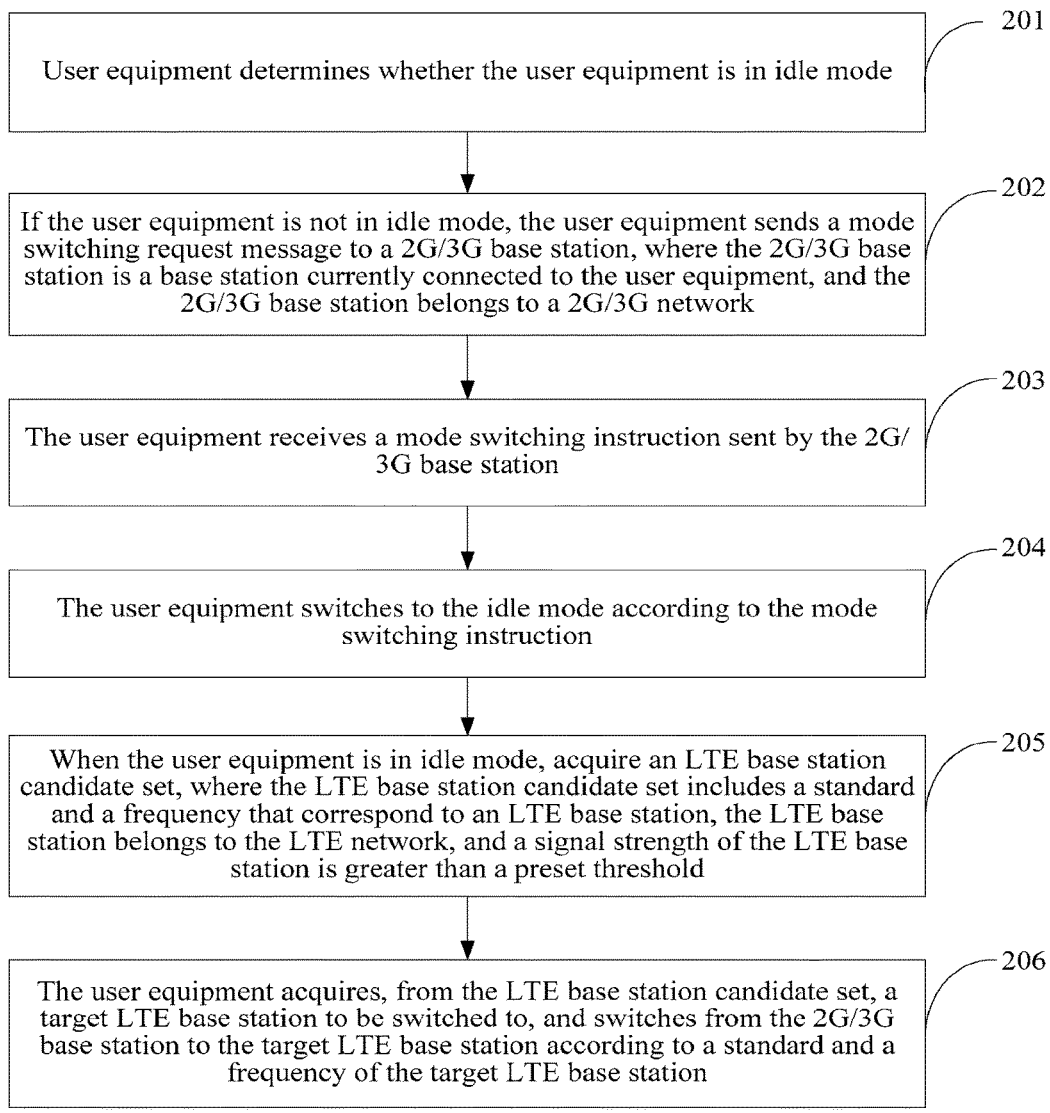
FIG. 2 is a flowchart of a circuit switched fallback switching method according to an embodiment of the present disclosure.

Embodiment 2 is another circuit switched fallback switching method provided in an embodiment of the present disclosure. The method is applied after user equipment ends a voice service in a 2G/3G network, where an idle mode is a mode when the user equipment does not establish an RRC connection to a network side. As shown in FIG. 2, the method includes:

201: User equipment determines whether the user equipment is in idle mode.

202: If the user equipment is not in idle mode, the user equipment sends a mode switching request message to a 2G/3G base station, where the 2G/3G base station is a base station currently connected to the user equipment, and the 2G/3G base station belongs to a 2G/3G network.

203: The user equipment receives a mode switching instruction sent by the 2G/3G base station.

204: The user equipment switches to the idle mode according to the mode switching instruction.

205: When the user equipment is in idle mode, acquire an LTE base station candidate set, where the LTE base station candidate set includes a standard and a frequency that correspond to an LTE base station, the LTE base station belongs to the LTE network, and a signal strength of the LTE base station is greater than a preset threshold.

206: The user equipment acquires, from the LTE base station candidate set, a target LTE base station to be switched to, and switches from the 2G/3G base station to the target LTE base station according to a standard and a frequency of the target LTE base station.

This embodiment of the present disclosure provides a circuit switched fallback switching method. After ending a voice service, user equipment not in idle mode sends a mode switching instruction to a network side, and the network side directs the user equipment to switch to the idle mode, so that the user equipment can switch back from a 2G/3G network to a previously connected LTE network.

Figure 3:
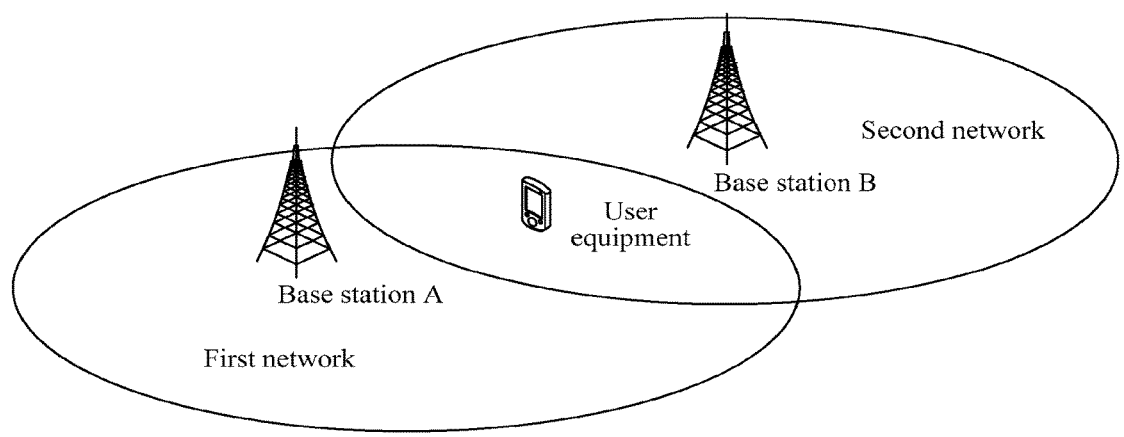
FIG. 3 is a schematic diagram of a networking scenario according to an embodiment of the present disclosure.
Figure 4A:
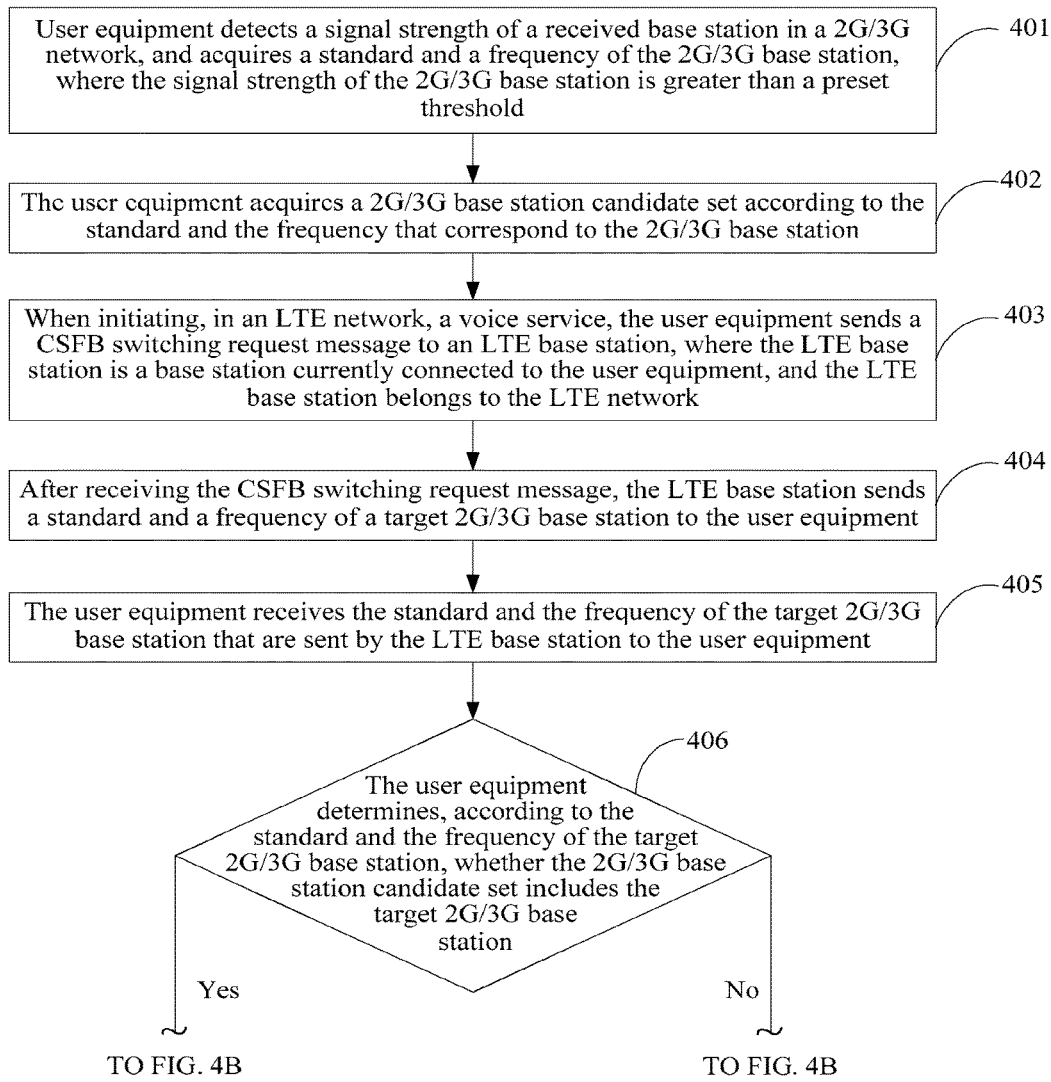
FIG. 4A and FIG. 4B are a flowchart of a circuit switched fallback switching method according to an embodiment of the present disclosure.
Figure 4B:
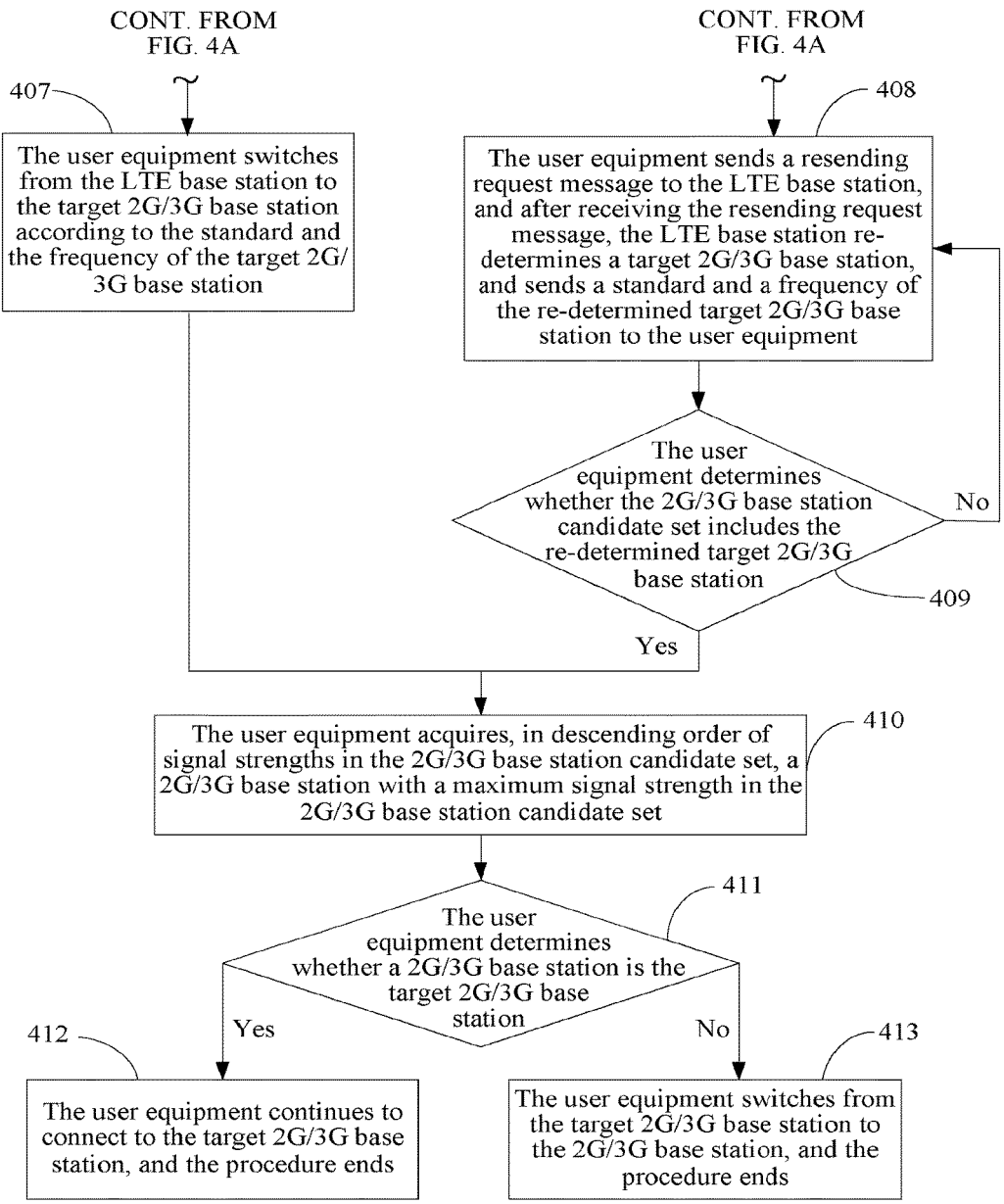

Embodiment 3 is a circuit switched fallback switching method provided in an embodiment of the present disclosure. The switching method is applied to a networking scenario, and the method is applied when user equipment initiates, in an LTE network, a voice service. In this case, the user equipment does not start the voice service. Referring to FIG. 3, in the networking scenario, the user equipment is located with a range of overlapping coverage between a 2G/3G network and the LTE network. The user equipment is currently connected to the LTE network; a standard of the 2G/3G network may be EHRPD (Evolved High Rate Packet Date), WCDMA (Wideband Code Division Multiple Access), or GSM (Global System for Mobile communication); a base station A is a base station that belongs to the 2G/3G network, and a base station B is a base station of the LTE network; in the networking scenario, both the base stations and the user equipment have a CSFB capability, and the user equipment is currently connected to the base station B, where the idle mode is a mode when the user equipment does not establish an RRC connection to a network side. As shown in FIG. 4A and FIG. 4B, the method includes:

401: User equipment detects a signal strength of a received base station in a 2G/3G network, and acquires a standard and a frequency of the 2G/3G base station, where the signal strength of the 2G/3G base station is greater than a preset threshold.

Specifically, the signal strength may be RSCP (Received Signal Code Power) corresponding to the 2G/3G base station. Correspondingly, the preset threshold may be an RSCP threshold. The user equipment detects signal strengths of all base stations, which are received by the user equipment, in the 2G/3G network, acquires a 2G/3G base station whose transmit power value is greater than a transmit power threshold, and acquires a standard and a frequency of the 2G/3G base station.

The process of acquiring, by user equipment, a standard and a frequency of the 2G/3G base station may be:

detecting, by the user equipment, a broadcast control channel of the 2G/3G base station, and after detecting the broadcast control channel of the 2G/3G base station, receiving a standard and a frequency that the 2G/3G base station loads onto the broadcast control channel.

Higher RSCP that corresponds to the 2G/3G base station and that is received by the user equipment indicates higher call quality of a voice call after the user equipment switches to the base station and enables the voice service. Therefore, by acquiring a base station whose signal strength is greater than a preset threshold, call quality after user equipment switches to the base station can be ensured.

With reference to the networking scenario provided in this embodiment of the present disclosure, it is assumed that, a signal strength of the base station A is greater than the preset threshold, and then after detecting the signal strength of the received base station A, the user equipment acquires the base station A as the 2G/3G base station.

Optionally, for a 2G/3G base station, a case in which a signal strength transiently increases may occur. Therefore, to ensure reliability of detecting, by user equipment, a signal strength of the 2G/3G base station, a signal strength of a received 2G/3G base station in a 2G/3G network may be detected every a preset cycle, an average value, within a preset time, of the signal strengths of the 2G/3G base station may be acquired, and then a 2G/3G base station whose average value of signal strengths is greater than a preset threshold may be acquired.

402: The user equipment acquires a 2G/3G base station candidate set according to the standard and the frequency that correspond to the 2G/3G base station.

Specifically, the user equipment generates the 2G/3G base station candidate set according to the standard and the frequency that correspond to the 2G/3G base station, or the user equipment sends the standard and the frequency that correspond to the 2G/3G base station to a server, the server generates the 2G/3G base station candidate set according to the standard and the frequency that correspond to the 2G/3G base station, and then the user equipment receives the 2G/3G base station candidate set sent by the server.

The 2G/3G base station candidate set may be a list that includes names of 2G/3G base stations and standards and frequencies that correspond to the 2G/3G base stations. Descriptions are provided by using an example in which a quantity of 2G/3G base stations included in a 2G/3G base station candidate set is three, and the list may be shown in Table 1:

TABLE 1

| 2G/3G base station candidate set |
| --- |
| Standard and frequency of a first 2G/3G base station |
| Standard and frequency of a second 2G/3G base station |
| Standard and frequency of a third 2G/3G base station |

Optionally, the list may further include signal strengths of the 2G/3G base stations.

In addition to being expressed as the foregoing list, the 2G/3G base station candidate set may be further expressed as another form, which is not limited herein.

It is noteworthy that, step 401 and step 402 are a process of acquiring the 2G/3G base station candidate set; the user equipment may acquire the 2G/3G base station candidate set after each preset time interval, so as to update the 2G/3G base station candidate set.

403: When initiating, in an LTE network, a voice service, the user equipment sends a CSFB switching request message to an LTE base station, where the LTE base station is a base station currently connected to the user equipment, and the LTE base station belongs to the LTE network.

Specifically, the LTE base station has a CSFB capability; therefore, the CSFB switching request message may be an attach request message sent by the user equipment to the LTE base station, where the attach request message includes a CSFB capability of the user equipment and a standard and a frequency of a target 2G/3G base station to which the user equipment is to switch, where the CSFB capability of the user equipment is used to indicate to the LTE base station that the user equipment supports CSFB, so that after receiving the CSFB switching request message, the base station may trigger a CSFB procedure.

The process of acquiring, by the user equipment, a standard and a frequency of a target 2G/3G base station may be:

before the voice service is initiated, receiving a system message sent by the LTE base station, where the system message includes a record of a connection to the user equipment and standards and frequencies of all 2G/3G base stations at a current location of the user equipment, and the connection record includes standards and frequencies of all 2G/3G base stations to which the user equipment has connected; and determining, by the user equipment, whether the connection record includes a 2G/3G base station at the current location of the user equipment.

Specifically, the user equipment performs matching between the standards and the frequencies of all the 2G/3G base stations at the current location and the standards and the frequencies of all the 2G/3G base stations to which the user equipment has connected; and determines, according to a matching result, whether all the 2G/3G base stations at the current location of the user equipment include a 2G/3G base station to which the user equipment has connected; and if the connection record includes the 2G/3G base station at the current location of the user equipment, determines that a 2G/3G base station to which the user equipment has connected at the current location is the target 2G/3G base station; or if the connection record does not include the 2G/3G base station at the current location of the user equipment, the user equipment determines, in descending order of signal strengths of all the 2G/3G base stations at the current location, that a 2G/3G base station with a maximum signal strength in all the 2G/3G base stations is the target 2G/3G base station.

Due to a delay and an error of measurement, a current location, which is stored in LTE, of user equipment may be different from an actual current location of the user equipment; therefore, the 2G/3G base station candidate set may not include the target 2G/3G base station. In addition, the current location of the user equipment may not include the 2G/3G base station that is stored in LTE and to which the user equipment has connected; therefore, the 2G/3G base station candidate set may not include the target 2G/3G base station either.

Before the user equipment sends the CSFB switching request message to the 2G/3G base station, the CSFB further needs to be prepared at a NAS (Non-Access Stratum) of the user equipment, where a specific manner in which the CSFB is prepared at the NAS stratum of the user equipment is not limited herein.

404: After receiving the CSFB switching request message, the LTE base station sends a standard and a frequency of a target 2G/3G base station to the user equipment.

Specifically, the LTE base station sends the standard and the frequency of the target 2G/3G base station to the user equipment by sending a redirection request message that includes the standard and the frequency of the target 2G/3G base station to the user equipment.

Before sending the standard and the frequency of the target 2G/3G base station to the user equipment, the LTE base station further needs to determine, according to the CSFB capability, in the CSFB switching request message, of the user equipment, whether the CSFB procedure can be initiated. After determining that the CSFB procedure can be initiated, the LTE base station performs the step of sending a standard and a frequency of a target 2G/3G base station to the user equipment.

Optionally, the redirection request message further includes authentication information, where the authentication information is generated after the LTE base station performs security setting on the redirection request message, and a specific security setting manner is not limited in this embodiment of the present disclosure.

405: The user equipment receives the standard and the frequency of the target 2G/3G base station that are sent by the LTE base station to the user equipment.

Specifically, if the LTE base station sends the standard and the frequency of the target 2G/3G base station to the user equipment by sending the redirection request message that includes the standard and the frequency of the target 2G/3G base station to the user equipment, after receiving the redirection request message, the user equipment acquires the standard and the frequency of the target 2G/3G base station from the redirection request message.

Optionally, if the redirection request message further includes the authentication information, after receiving the redirection request message, the user equipment first performs an authentication operation according to the authentication information, and then acquires the standard and the frequency of the target 2G/3G base station from the redirection request message after authentication succeeds. A specific authentication operation manner is not limited in this embodiment of the present disclosure.

406: The user equipment determines, according to the standard and the frequency of the target 2G/3G base station, whether the 2G/3G base station candidate set includes the target 2G/3G base station, and if the 2G/3G base station candidate set includes the target 2G/3G base station, perform step 407; or if the 2G/3G base station candidate set does not include the target 2G/3G base station, perform step 408.

Specifically, the user equipment may perform matching between the standard and the frequency of the target 2G/3G base station and the standards and the frequencies of the 2G/3G base stations in the 2G/3G base station candidate set, to determine whether the 2G/3G base station candidate set includes the target 2G/3G base station; the user equipment may further preset a determining algorithm, enter the standard and the frequency of the target 2G/3G base station and the standards and the frequencies of the 2G/3G base stations into the determining algorithm, acquires an output result, and determine, according to the output result, whether the 2G/3G base station candidate set includes the target 2G/3G base station; the user equipment may further determine, in another manner, whether the 2G/3G base station candidate set includes the target 2G/3G base station, which is not limited herein.

407: The user equipment switches from the LTE base station to the target 2G/3G base station according to the standard and the frequency of the target 2G/3G base station, and the procedure ends.

Specifically, the user equipment first determines the target 2G/3G base station according to a frequency in the standard and the frequency of the target 2G/3G base station;

after determining the target 2G/3G base station, sends a connection request to the target 2G/3G base station according to the standard of the target 2G/3G base station; and the target 2G/3G base station receives the connection request, and establishes a connection to the user equipment after determining that the user equipment is allowed to connect to the target 2G/3G base station.

408: The user equipment sends a resending request message to the LTE base station, and after receiving the resending request message, the LTE base station re-determines a target 2G/3G base station, and sends a standard and a frequency of the re-determined target 2G/3G base station to the user equipment.

Specifically, the resending request message may be an attach request message that does not include the standard and the frequency of the target 2G/3G base station, and is used to indicate to the LTE base station that the 2G/3G base station candidate set does not include the target 2G/3G base station.

The signal strengths of the 2G/3G base stations in the 2G/3G base station candidate set are all greater than the preset threshold; therefore, when the 2G/3G base station candidate set does not include the target 2G/3G base station, it indicates that a signal strength of the target 2G/3G base station is less than the preset threshold; as a result, the user equipment cannot detect the target 2G/3G base station, or the user equipment can detect the target 2G/3G base station, but the target 2G/3G base station is unavailable because the signal strength of the target 2G/3G base station is less than the preset threshold. Therefore, when the 2G/3G base station candidate set does not include the target 2G/3G base station, the user equipment needs to send a resending request message to the LTE base station, so that the LTE base station re-determines a target 2G/3G base station, and sends a standard and a frequency of the re-determined target 2G/3G base station to the user equipment.

The process of re-determining, by the LTE base station, a target 2G/3G base station may be:

determining, by the LTE base station, in descending order of signal strengths of all the 2G/3G base stations at the current location of the user equipment, that a 2G/3G base station with a maximum signal strength in all 2G/3G base stations is the re-determined target 2G/3G base station.

After the LTE base station re-determines the target 2G/3G base station, the LTE base station sends a redirection request to the user equipment, where the redirection request includes the standard and the frequency of the re-determined target 2G/3G base station.

409: The user equipment determines whether the 2G/3G base station candidate set includes the re-determined target 2G/3G base station, and if the 2G/3G base station candidate set does not include the re-determined target 2G/3G base station, the user equipment continues to perform the step of sending a resending request message to the LTE base station.

The user equipment may not detect the target 2G/3G base station, and the user equipment can detect a 2G/3G base station in the 2G/3G base station candidate set; therefore, by using a process of step 405 to step 408, it can be ensured that the user equipment can detect the target 2G/3G base station sent by the LTE base station.

Optionally, to obtain better call quality, step 410 may be further performed.

410: The user equipment acquires, in descending order of signal strengths in the 2G/3G base station candidate set, a 2G/3G base station with a maximum signal strength in the 2G/3G base station candidate set.

Specifically, the user equipment has detected the signal strengths of the 2G/3G base stations in the 2G/3G base station candidate set in advance; therefore, the user equipment may acquire, in descending order of the signal strengths, which have been detected in advance, of the 2G/3G base stations, the 2G/3G base station with the maximum signal strength in the 2G/3G base station candidate set.

411: The user equipment determines whether a 2G/3G base station is the target 2G/3G base station, and if the 2G/3G base station is the target 2G/3G base station, perform step 412; or if the 2G/3G base station is the target 2G/3G base station, perform step 413.

Specifically, the user equipment may perform matching between a standard and a frequency of the 2G/3G base station and the standard and the frequency of the target 2G/3G base station, and determine whether the 2G/3G base station is the target 2G/3G base station according to a matching result.

In addition to the foregoing manner, the user equipment may further preset a determining algorithm, then enters the standard and the frequency of the 2G/3G base station and the standard and the frequency of the target 2G/3G base station into the determining algorithm, to obtain an output result, and determines whether the 2G/3G base station is the target 2G/3G base station according to the output result.

The user equipment may further determine, in another manner, whether the 2G/3G base station is the target 2G/3G base station, which is not limited herein.

412: The user equipment continues to connect to the target 2G/3G base station, and the procedure ends.

413: The user equipment switches from the target 2G/3G base station to the 2G/3G base station, and the procedure ends.

Specifically, a process of switching, by the user equipment, from the target 2G/3G base station to the 2G/3G base station is the same as a process of switching, by the user equipment, from the LTE base station to the target 2G/3G base station in step 406, and details are not described herein.

Figure 5:
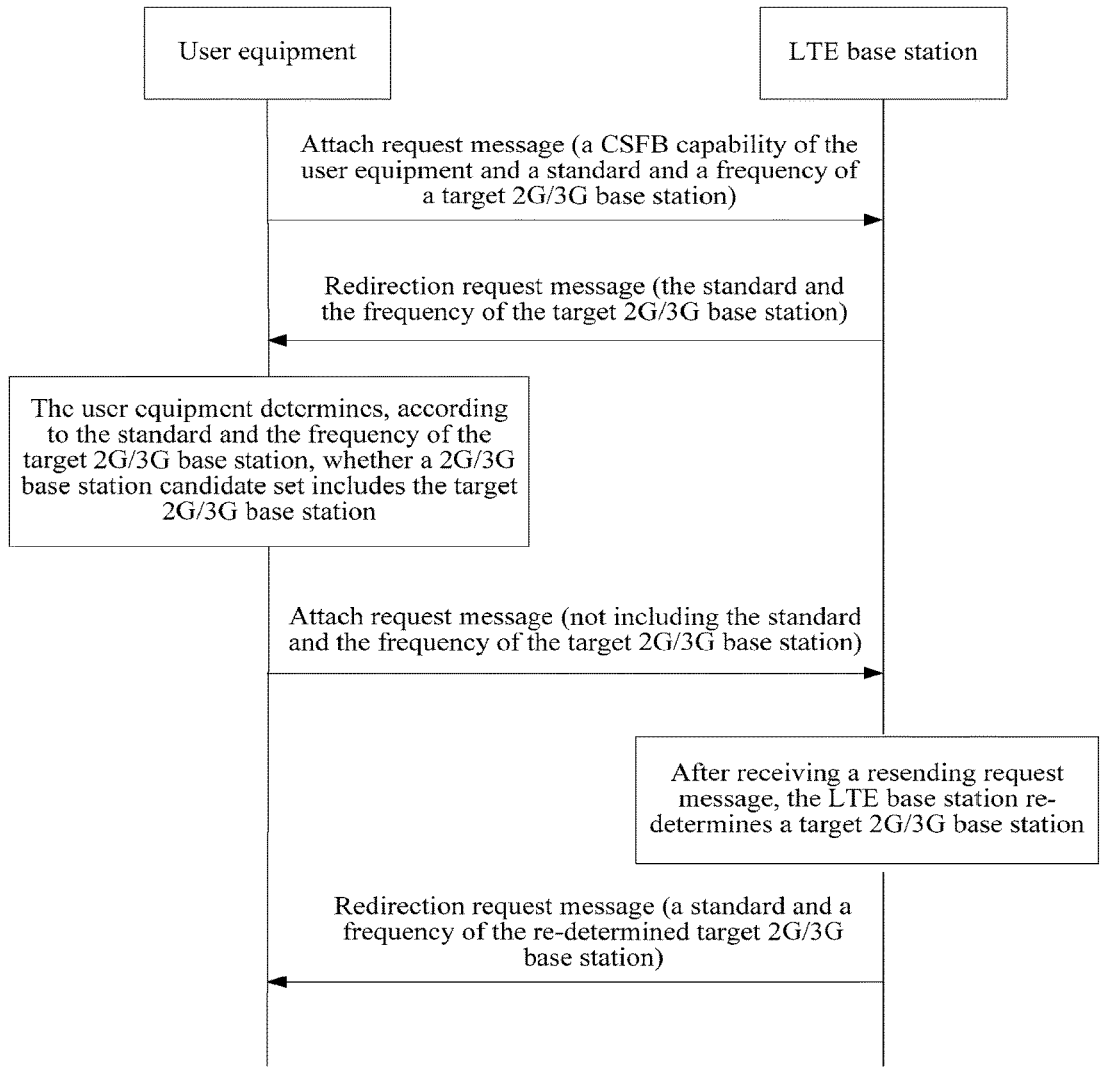
FIG. 5 is a schematic diagram of signaling message exchange according to an embodiment of the present disclosure.

Before step 403, the user equipment is in idle mode, and does not have signaling exchange with the LTE base station. However, in step 403 and after step 403, to initiate a voice service, the base station establishes an RRC connection to the user equipment; in this case, the LTE base station and the user equipment may interact with each other by using signaling messages, as shown in FIG. 5, where that the LTE base station and the user equipment interact with each other by using signaling messages may be implemented by using an independent dedicated control channel between the LTE base station and user equipment.

It should be noted that, the signaling messages listed in this embodiment of the present disclosure are only routine in implementation, and in an actual application, there may also be other signaling messages, which is not limited in this embodiment of the present disclosure.

This embodiment of the present disclosure provides a circuit switched fallback switching method. It is determined that a target 2G/3G base station to which a user is to switch is a base station in a 2G/3G base station candidate set that has been acquired in advance, so that repeated detection of a target 2G/3G base station is avoided, a delay when a voice service is initiated is reduced, and reliability of the voice service is improved. Further, it is determined that the target 2G/3G base station to be switched to is a base station with a maximum signal strength in the 2G/3G base station candidate set, so that after the voice service starts, better call quality can be obtained.

Figure 6:
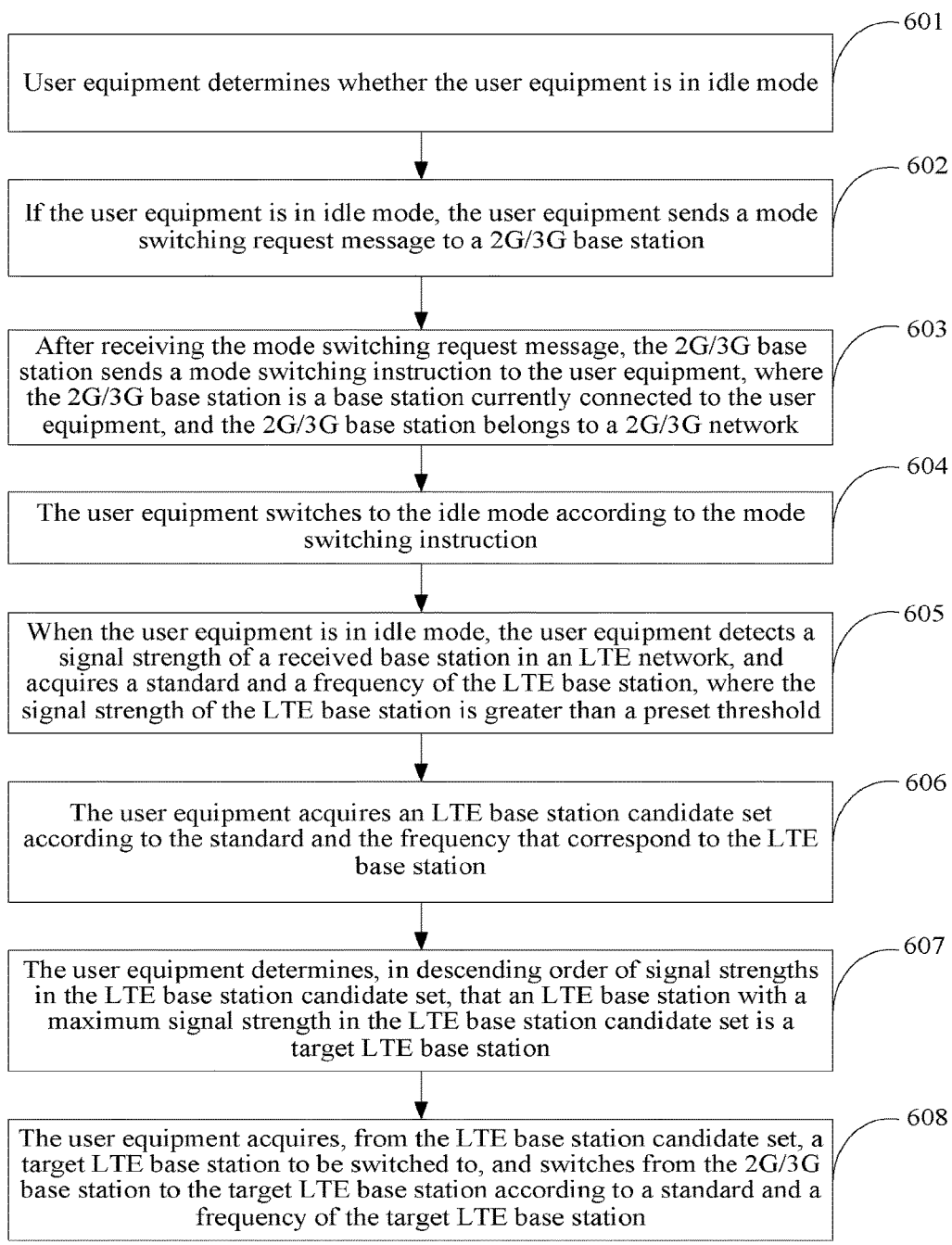
FIG. 6 is a flowchart of a circuit switched fallback switching method according to an embodiment of the present disclosure.

Embodiment 4 is a circuit switched fallback switching method provided in an embodiment of the present disclosure. A networking scenario to which the switching method is applied is the same as that in the previous embodiment. A difference from the previous embodiment is that, the method is applied after user equipment ends a voice service in a 2G/3G network. After the voice service is ended, the user equipment may be in non-idle mode, and the user equipment cannot switch the user equipment to an idle mode; as a result, the user equipment cannot switch back to a previously connected LTE network, causing the user equipment to be disconnected from the network. Therefore, the method is applied after the voice service is ended, to switch the user equipment to switch back to the previously connected LTE network, where the idle mode is a mode when the user equipment does not establish an RRC connection to a network side. As shown in FIG. 6, the method includes:

601: User equipment determines whether the user equipment is in idle mode.

Specifically, after a voice service is ended, if data transmission still exists between the user equipment and a currently connected 2G/3G base, the user equipment is caused to be in non-idle mode; therefore, the user equipment may determine whether the user equipment is in idle mode by determining whether data transmission exists between the user equipment and a 2G/3G base station. It should be noted that, in this embodiment of the present disclosure, specifically determining whether the user equipment is in idle mode is not limited.

602: If the user equipment is not in idle mode, the user equipment sends a mode switching request message to a 2G/3G base station.

Specifically, the mode switching request message includes a device identifier of the user equipment, and the device identifier of the user equipment may be an IP address of the user equipment, or may be a MAC address of the user equipment, or may be another identifier, which is not limited in this embodiment of the present disclosure.

The user equipment cannot switch the user equipment from a non-idle mode to the idle mode, and in this case, the user equipment is connected to the 2G/3G base station; therefore, the user equipment needs to send the mode switching request message to the 2G/3G base station, and the 2G/3G base station sends a mode switching instruction to a user, to switch the user equipment to the idle mode.

603: After receiving the mode switching request message, the 2G/3G base station sends a mode switching instruction to the user equipment, where the 2G/3G base station is a base station currently connected to the user equipment, and the 2G/3G base station belongs to a 2G/3G network.

Specifically, the 2G/3G base station sends, according to the device identifier in the mode switching request message, the mode switching instruction to the user equipment indicated by the device identifier; in addition, after sending the mode switching instruction to the user equipment, the 2G/3G base station stops an RRC connection to the user equipment, and directs the user equipment to switch to the idle mode.

Optionally, to prevent a data loss caused by an interruption of data transmission, before stopping data transmission between the 2G/3G base station and the user equipment, the 2G/3G base station may save a data transmission process, and sends, in a subsequent process, the data transmission process to a target LTE base station to which the user equipment is to switch, so that after switching to the target LTE base station, the user equipment may continue to perform data transmission with the target LTE base station according to the data transmission process.

604: The user equipment switches to the idle mode according to the mode switching instruction.

Specifically, after receiving the mode switching instruction, the user equipment responds to the mode switching instruction, and stops the RRC connection between the user equipment and the 2G/3G base station, to switch a mode of the user equipment to the idle mode.

Optionally, in addition to that the 2G/3G base station saves the data transmission process to prevent the data loss, before switching to the idle mode, the user equipment may also store the data transmission process, so that after switching to the target LTE base station, the user equipment may continue to perform data transmission with the target LTE base station according to the data transmission process.

It should be noted that, if the user equipment is in idle mode, after step 501, 605 is directly performed.

The user equipment can acquire an LTE base station candidate set only when the user equipment is in idle mode; therefore, by using step 601 to step 604, the user equipment can be switched to the idle mode, so that the user equipment can acquire the LTE base station candidate set when the user equipment is in idle mode.

605: When the user equipment is in idle mode, the user equipment detects a signal strength of a received base station in an LTE network, and acquires a standard and a frequency of the LTE base station, where the signal strength of the LTE base station is greater than a preset threshold.

606: The user equipment acquires an LTE base station candidate set according to the standard and the frequency that correspond to the LTE base station.

A process of acquiring the LTE base station candidate set in step 605 and step 606 is the same as a process of acquiring the 2G/3G base station candidate set in step 401 and step 402 in the previous embodiment, and details are not described herein.

607: The user equipment determines, in descending order of signal strengths in the LTE base station candidate set, that an LTE base station with a maximum signal strength in the LTE base station candidate set is a target LTE base station.

Step 607 of acquiring an LTE base station with a maximum signal strength is the same as step 409 in the previous embodiment, and details are not described herein.

Step 605 to step 607 are a process of acquiring the target LTE base station to which the user equipment is to switch. A higher signal strength of a base station received by the user equipment indicates higher call quality of a voice call after the user equipment switches to the base station and enables the voice service. Therefore, by determining that the LTE base station with the maximum signal strength is the target LTE base station, call quality after user equipment switches to the base station can be ensured.

608: The user equipment acquires, from the LTE base station candidate set, a target LTE base station to be switched to, and switches from the 2G/3G base station to the target LTE base station according to a standard and a frequency of the target LTE base station.

Specifically, a process of switching, by the user equipment, from the 2G/3G base station to the target LTE base station is the same as a process of switching, by the user equipment, from the LTE base station to the target 2G/3G base station in step 406 in the previous embodiment, and details are not described herein.

It should be noted that, in this embodiment, before the user equipment switches to the idle mode, interaction between the user equipment and the 2G/3G base station by using signaling messages is mainly that the user equipment sends a mode switching request message to the 2G/3G base station, and the 2G/3G base station sends a mode switching instruction to the user equipment, where the interaction by using the signaling messages can be implemented by using an independent dedicated control channel. After the user equipment switches to the idle mode, the interaction by using the signaling message exists neither between the user equipment and the 2G/3G base station, nor between the user equipment and the LTE base station.

The signaling messages listed in this embodiment of the present disclosure are only routine in implementation, and in an actual application, there may also be other signaling messages, which is not limited in this embodiment of the present disclosure.

This embodiment of the present disclosure provides a circuit switched fallback switching method. After ending a voice service, user equipment not in idle mode sends a mode switching instruction to a network side, and the network side directs the user equipment to switch to the idle mode, so that the user equipment can switch back from a 2G/3G network to a previously connected LTE network; in addition, a base station to which the user equipment switches is a base station with a maximum signal strength in the LTE network; therefore, after the user equipment switches back to the LTE network, quality of a signal received by a user can be ensured.

Figure 7:
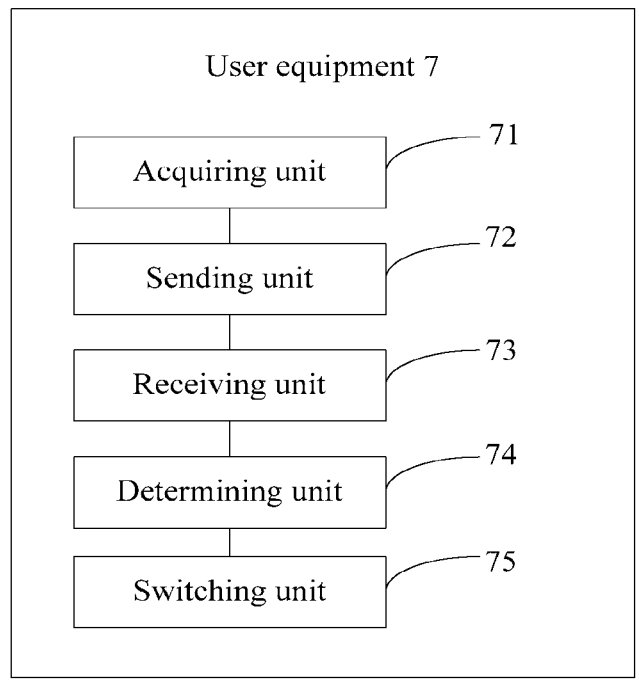
FIG. 7 is a schematic structural diagram of user equipment according to an embodiment of the present disclosure.

Embodiment 5 is user equipment 7 provided in an embodiment of the present disclosure. As shown in FIG. 7, the user equipment 7 includes:

an acquiring unit 71, configured to: when the user equipment is in idle mode, acquire a 2nd/3rd generation mobile phone communications technology specification 2G/3G base station candidate set, where the 2G/3G base station candidate set includes a standard and a frequency that correspond to a 2G/3G base station, the 2G/3G base station belongs to a 2G/3G network, and a signal strength of the 2G/3G base station is greater than a preset threshold;

a sending unit 72, configured to: when the user equipment initiates, in an LTE network, a voice service, send, by the user equipment, a circuit switched fallback CSFB request message to a Long Term Evolution LTE base station, where the LTE base station is a base station currently connected to the user equipment, the LTE base station belongs to the LTE network, and the CSFB request message includes a standard and a frequency of a target 2G/3G base station;

a receiving unit 73, configured to receive the standard and the frequency of the target 2G/3G base station that are sent by the LTE base station to the user equipment;

a determining unit 74, configured to determine, according to the standard and the frequency of the target 2G/3G base station, whether the 2G/3G base station candidate set includes the target 2G/3G base station; and a switching unit 75, configured to: when the 2G/3G base station candidate set includes the target 2G/3G base station, switch from the LTE base station to the target 2G/3G base station according to the standard and the frequency of the target 2G/3G base station.

Optionally, the acquiring unit 71 includes:

a first acquiring subunit, configured to detect the signal strength of the received base station in the 2G/3G network, and acquire the standard and the frequency of the 2G/3G base station, where the signal strength of the 2G/3G base station is greater than the preset threshold; and a second acquiring subunit, configured to receive the 2G/3G base station candidate set according to the 2G/3G base station and the standard and the frequency that correspond to the 2G/3G base station.

Optionally, the first acquiring subunit is specifically configured to receive, by detecting a broadcast control channel of the 2G/3G base station, a standard and a frequency that the 2G/3G base station loads onto the broadcast control channel; and the second acquiring subunit is specifically configured to generate the 2G/3G base station candidate set according to the 2G/3G base station and the standard and the frequency that correspond to the 2G/3G base station; or the second acquiring subunit 712 is specifically configured to:

send the 2G/3G base station and the standard and the frequency that correspond to the 2G/3G base station to a server; and receive the 2G/3G base station candidate set sent by the server.

Optionally, if the 2G/3G base station candidate set does not include the target 2G/3G base station, the sending unit 72 is further configured to send a resending request message to the LTE base station, where the resending request message is used to indicate to the LTE base station that the 2G/3G base station candidate set does not include the target 2G/3G base station; and after the LTE base station re-determines a target 2G/3G base station, and sends a standard and a frequency of the re-determined target 2G/3G base station to the user equipment, the determining unit 74 is further configured to determine whether the 2G/3G base station candidate set includes the re-determined target 2G/3G base station, and if the 2G/3G base station candidate set does not include the re-determined target 2G/3G base station, trigger the sending unit 72 to continue to perform the step of sending a resending request message to the LTE base station.

Optionally, the acquiring unit 71 is further configured to acquire, in descending order of signal strengths in the 2G/3G base station candidate set, a 2G/3G base station with a maximum signal strength in the 2G/3G base station candidate set; and the switching unit 75 is further configured to switch the user equipment to the 2G/3G base station according to a standard and a frequency of the 2G/3G base station.

Optionally, the determining unit 74 is further configured to determine whether the 2G/3G base station is the target 2G/3G base station, and if the 2G/3G base station is the target 2G/3G base station, the switching unit 75 continues to connect to the target 2G/3G base station; or if the 2G/3G base station is not the target 2G/3G base station, the switching unit 75 is further configured to switch from the target 2G/3G base station to the 2G/3G base station.

Optionally, the receiving unit 73 is further configured to: before the voice service is initiated, receive a system message sent by the LTE base station, where the system message includes a record of a connection to the user equipment and standards and frequencies of all 2G/3G base stations at a current location of the user equipment, and the connection record includes standards and frequencies of all 2G/3G base stations to which the user equipment has connected;

the determining unit 74 is further configured to determine whether the connection record includes a 2G/3G base station at the current location of the user equipment; and if the connection record includes the 2G/3G base station at the current location of the user equipment, the acquiring unit 71 is further configured to determine that a 2G/3G base station to which the user equipment has connected at the current location is the target 2G/3G base station; or if the connection record does not include the 2G/3G base station at the current location of the user equipment, the acquiring unit 71 is further configured to determine, in descending order of signal strengths of all the 2G/3G base stations at the current location, that a 2G/3G base station with a maximum signal strength in all the 2G/3G base stations is the target 2G/3G base station.

Optionally, the determining unit 74 is further configured to determine whether the user equipment is in idle mode;

the sending unit 72 is configured to: if the user equipment is not in idle mode, send a mode switching request message to a 2G/3G base station, so that after receiving the mode switching request message, the 2G/3G base station sends a mode switching instruction to the user equipment, where the 2G/3G base station is a base station currently connected to the user equipment, and the 2G/3G base station belongs to a 2G/3G network;

the receiving unit 73 is further configured to receive the mode switching instruction sent by the 2G/3G base station;

the switching unit 75 is further configured to switch to the idle mode according to the mode switching instruction;

the acquiring unit 71 is configured to acquire an LTE base station candidate set, where the LTE base station candidate set includes a standard and a frequency that correspond to the LTE base station, the LTE base station belongs to the LTE network, and a signal strength of the LTE base station is greater than the preset threshold;

the acquiring unit 71 is further configured to acquire, from the LTE base station candidate set, a target LTE base station to be switched to; and the switching unit 75 is further configured to switch from the 2G/3G base station to the target LTE base station according to a standard and a frequency of the target LTE base station.

Optionally, the first acquiring subunit is further configured to detect the signal strength of the received base station in the LTE network, and acquire the standard and the frequency of the LTE base station, where the signal strength of the LTE base station is greater than the preset threshold; and the second acquiring subunit is further configured to receive the LTE base station candidate set according to the LTE base station and the standard and the frequency that correspond to the LTE base station.

Optionally, the first acquiring subunit is specifically configured to receive, by detecting a broadcast control channel of the LTE base station, a standard and a frequency that the LTE base station loads onto the broadcast control channel; and the second acquiring subunit is specifically configured to generate the LTE base station candidate set according to the LTE base station and the standard and the frequency that correspond to the LTE base station; or the second acquiring subunit is specifically configured to:

send the LTE base station and the standard and the frequency that correspond to the LTE base station to a server; and receive the 2G/3G base station candidate set sent by the server.

Optionally, a third acquiring subunit is further configured to determine, in descending order of signal strengths in the LTE base station candidate set, that an LTE base station with a maximum signal strength in the LTE base station candidate set is the target LTE base station.

This embodiment of the present disclosure provides a switching method. By means of the user equipment, after ending a voice service, user equipment not in idle mode sends a mode switching instruction to a network side, and the network side directs the user equipment to switch to the idle mode, so that the user equipment can switch back from a 2G/3G network to a previously connected LTE network.

Figure 8:
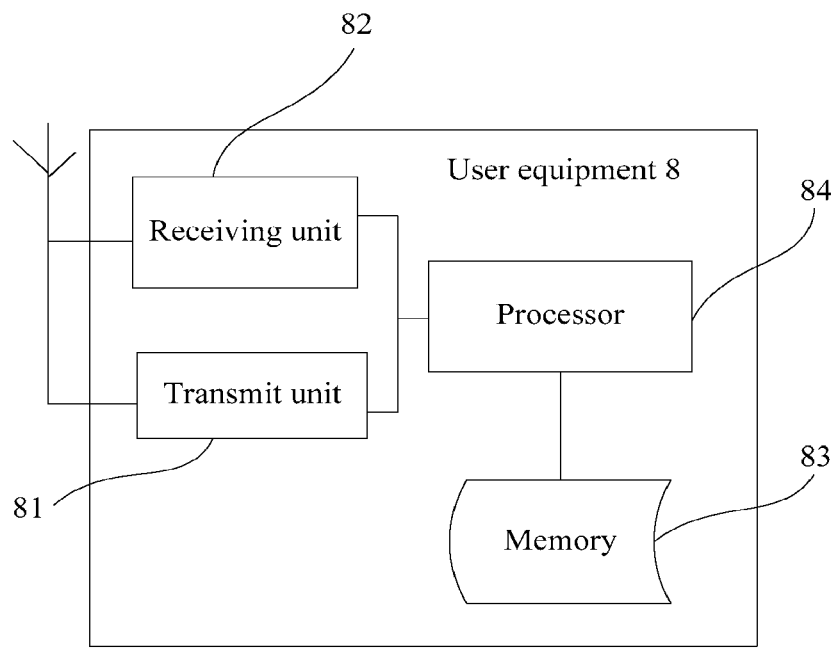
FIG. 8 is a schematic structural diagram of user equipment according to an embodiment of the present disclosure.

Embodiment 7 is user equipment 8 provided in an embodiment of the present disclosure. Referring to FIG. 8, the user equipment 8 includes: a transmit unit 81, a receiving unit 82, a memory 83, and a processor 84 that is separately connected to the transmit unit 81, the receiving unit 82, and the memory 83. Certainly, the user equipment may further include a general part such as an antenna, a baseband processing unit, an intermediate radio frequency processing unit, and an input/output apparatus, which is not limited in this embodiment of the present disclosure herein.

The memory 83 stores a set of program code 830, and the processor 84 is configured to invoke the program code 830 stored in the memory 83, to perform the following operations:

when user equipment is in idle mode, acquiring a 2nd/3rd generation mobile phone communications technology specification 2G/3G base station candidate set, where the 2G/3G base station candidate set includes a standard and a frequency that correspond to a 2G/3G base station, the 2G/3G base station belongs to a 2G/3G network, and a signal strength of the 2G/3G base station is greater than a preset threshold;

when the user equipment initiates, in an LTE network, a voice service, sending, by the user equipment, a circuit switched fallback CSFB request message to a Long Term Evolution LTE base station, where the LTE base station is a base station currently connected to the user equipment, the LTE base station belongs to the LTE network, and the CSFB request message includes a standard and a frequency of a target 2G/3G base station;

receiving, by the user equipment, the standard and the frequency of the target 2G/3G base station that are sent by the LTE base station to the user equipment;

determining, by the user equipment according to the standard and the frequency of the target 2G/3G base station, whether the 2G/3G base station candidate set includes the target 2G/3G base station; and if the 2G/3G base station candidate set includes the target 2G/3G base station, switching, by the user equipment, from the LTE base station to the target 2G/3G base station according to the standard and the frequency of the target 2G/3G base station.

Optionally, the memory 83 stores a set of program code 830, and the processor 84 is configured to invoke the program code 830 stored in the memory 83, to perform the following operations:

detecting, by the user equipment, the signal strength of the received base station in the 2G/3G network, and acquiring the standard and the frequency of the 2G/3G base station, where the signal strength of the 2G/3G base station is greater than the preset threshold; and receiving, by the user equipment, the 2G/3G base station candidate set according to the 2G/3G base station and the standard and the frequency that correspond to the 2G/3G base station.

Optionally, the memory 83 stores a set of program code 830, and the processor 84 is configured to invoke the program code 830 stored in the memory 83, to perform the following operations:

receiving, by the user equipment, by detecting a broadcast control channel of the 2G/3G base station, a standard and a frequency that the 2G/3G base station loads onto the broadcast control channel; and generating, by the user equipment, the 2G/3G base station candidate set according to the 2G/3G base station and the standard and the frequency that correspond to the 2G/3G base station; or sending, by the user equipment, the 2G/3G base station and the standard and the frequency that correspond to the 2G/3G base station to a server; and receiving, by the user equipment, the 2G/3G base station candidate set sent by the server.

Optionally, the memory 83 stores a set of program code 830, and the processor 84 is configured to invoke the program code 830 stored in the memory 83, to perform the following operations:

if the 2G/3G base station candidate set does not include the target 2G/3G base station, sending, by the user equipment, a resending request message to the LTE base station, where the resending request message is used to indicate to the LTE base station that the 2G/3G base station candidate set does not include the target 2G/3G base station; and after the LTE base station re-determines a target 2G/3G base station, and sends a standard and a frequency of the re-determined target 2G/3G base station to the user equipment, determining, by the user equipment, whether the 2G/3G base station candidate set includes the re-determined target 2G/3G base station, and if the 2G/3G base station candidate set does not include the re-determined target 2G/3G base station, continuing, by the user equipment, to perform the step of sending a resending request message to the LTE base station.

Optionally, the memory 83 stores a set of program code 830, and the processor 84 is configured to invoke the program code 830 stored in the memory 83, to perform the following operations:

acquiring, by the user equipment, in descending order of signal strengths in the 2G/3G base station candidate set, a 2G/3G base station with a maximum signal strength in the 2G/3G base station candidate set; and switching, by the user equipment, the user equipment to the 2G/3G base station according to a standard and a frequency of the 2G/3G base station.

Optionally, the memory 83 stores a set of program code 830, and the processor 84 is configured to invoke the program code 830 stored in the memory 83, to perform the following operations:

determining, by the user equipment, whether the 2G/3G base station is the target 2G/3G base station, and if the 2G/3G base station is the target 2G/3G base station, continuing to connect, by the user equipment, to the target 2G/3G base station; or if the 2G/3G base station is not the target 2G/3G base station, switching, by the user equipment, from the target 2G/3G base station to the 2G/3G base station.

Optionally, the memory 83 stores a set of program code 830, and the processor 84 is configured to invoke the program code 830 stored in the memory 83, to perform the following operations:

before initiating the voice service, receiving, by the user equipment, a system message sent by the LTE base station, where the system message includes a record of a connection to the user equipment and standards and frequencies of all 2G/3G base stations at a current location of the user equipment, and the connection record includes standards and frequencies of all 2G/3G base stations to which the user equipment has connected;

determining, by the user equipment, whether the connection record includes a 2G/3G base station at the current location of the user equipment; and if the connection record includes the 2G/3G base station at the current location of the user equipment, determining, by the user equipment, that a 2G/3G base station to which the user equipment has connected at the current location is the target 2G/3G base station; or if the connection record does not include the 2G/3G base station at the current location of the user equipment, determining, by the user equipment, in descending order of signal strengths of all the 2G/3G base stations at the current location, that a 2G/3G base station with a maximum signal strength in all the 2G/3G base stations is the target 2G/3G base station.

Optionally, the memory 83 stores a set of program code 830, and the processor 84 is configured to invoke the program code 830 stored in the memory 83, to perform the following operations:

determining, by the user equipment, whether the user equipment is in idle mode;

if the user equipment is not in idle mode, sending, by the user equipment, a mode switching request message to a 2G/3G base station, where the 2G/3G base station is a base station currently connected to the user equipment, and the 2G/3G base station belongs to the 2G/3G network;

receiving, by the user equipment, a mode switching instruction sent by the 2G/3G base station; and switching, by the user equipment, to the idle mode according to the mode switching instruction; or when the user equipment is in idle mode, acquiring an LTE base station candidate set, where the LTE base station candidate set includes a standard and a frequency that correspond to the LTE base station, the LTE base station belongs to the LTE network, and a signal strength of the LTE base station is greater than the preset threshold; and acquiring, by the user equipment, from the LTE base station candidate set, a target LTE base station to be switched to, and switching from the 2G/3G base station to the target LTE base station according to a standard and a frequency of the target LTE base station.

Optionally, the memory 83 stores a set of program code 830, and the processor 84 is configured to invoke the program code 830 stored in the memory 83, to perform the following operations:

detecting, by the user equipment, the signal strength of the received base station in the LTE network, and acquiring the standard and the frequency of the LTE base station, where the signal strength of the LTE base station is greater than the preset threshold; and receiving, by the user equipment, the LTE base station candidate set according to the LTE base station and the standard and the frequency that correspond to the LTE base station.

Optionally, the memory 83 stores a set of program code 830, and the processor 84 is configured to invoke the program code 830 stored in the memory 83, to perform the following operations:

receiving, by the user equipment, by detecting a broadcast control channel of the LTE base station, a standard and a frequency that the LTE base station loads onto the broadcast control channel; and generating, by the user equipment, the LTE base station candidate set according to the LTE base station and the standard and the frequency that correspond to the LTE base station; or sending, by the user equipment, the LTE base station and the standard and the frequency that correspond to the LTE base station to a server; and receiving, by the user equipment, the LTE base station candidate set sent by the server.

Optionally, the memory 83 stores a set of program code 830, and the processor 84 is configured to invoke the program code 830 stored in the memory 83, to perform the following operations:

determining, by the user equipment, in descending order of signal strengths in the LTE base station candidate set, that an LTE base station with a maximum signal strength in the LTE base station candidate set is the target LTE base station.

This embodiment of the present disclosure provides user equipment. The user equipment determines that a target 2G/3G base station to which the user equipment is to switch is a base station in a 2G/3G base station candidate set that has been acquired in advance, so that repeated detection of a target 2G/3G base station is avoided, a delay when a voice service is initiated is reduced, and reliability of the voice service is improved. In addition, after ending a voice service, user equipment not in idle mode sends a mode switching instruction to a network side, and the network side directs the user equipment to switch to the idle mode, so that the user equipment can switch back from a 2G/3G network to a previously connected LTE network.

It should be noted that: the foregoing sending unit may be a transmitter (transmitting circuit) or a transceiver (transceiver circuit), the foregoing receiving unit may be a receiver (receiving circuit) or a transceiver, and the sending unit and the receiving unit may be integrated with each other to form a receiving and sending unit, which is a transceiver in hardware implementation. The foregoing control unit may be embedded in or independent of, in a hardware form, a processor of the base station, or may be stored, in a software form, in a memory of the base station, so that the processor invokes and performs the operations corresponding to the foregoing modules. The processor may be a central processing unit (CPU), a microprocessor, a single-chip microcomputer, or the like.

It should be noted that, when the user equipment provided in the foregoing embodiments performs circuit switched fallback switching, division of the foregoing functional modules is merely used as an example for description. In an actual application, the foregoing functions may be allocated to different functional modules according to a need, that is, the inner structures of an apparatus and a device are divided to different functional modules, to complete all or some of the functions described above. In addition, the user equipment provided in the foregoing embodiments is based on the same concept as the circuit switched fallback switching method embodiments. For a specific implementation process, refer to the method embodiments, and details are not described herein again.

The sequence numbers of the foregoing embodiments of the present disclosure are merely for illustrative purposes, and are not intended to indicate priorities of the embodiments.

The terms used in the embodiments of the present disclosure are merely for the purpose of illustrating specific embodiments, and are not intended to limit the present disclosure. The terms "a", "said" and "the" of singular forms used in the embodiments and the appended claims of the present disclosure are also intended to include plural forms, unless otherwise specified in the context clearly. It should also be understood that, the term "and/or" used herein indicates and includes any or all possible combinations of one or more associated listed items.

It should be understood that, although in the embodiments of the present disclosure, various switching units and acquiring units may be described by using terms such as first and second, these units should not be limited to these terms. These terms are only used to differentiate the switching units or the acquiring units from one another. For example, in a case in which the scope of the embodiments of the present disclosure is not exceeded, a first acquiring unit may also be referred to as a second acquiring unit.

Depending on the context, for example, words "if" used herein may be explained as "while" or "when" or "in response to determining" or "in response to detection". Similarly, depending on the context, phrases "if determining" or "if detecting (a stated condition or event)" may be explained as "when determining" or "in response to determining" or "when detecting (the stated condition or event)" or "in response to detecting (the stated condition or event)".

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A circuit switched fallback (CSFB) switching method for use in a user equipment, wherein the method comprises:
   when the user equipment is in an idle mode, acquiring a 2nd/3rd generation mobile phone communications technology (2G/3G) base station candidate set, the 2G/3G base station candidate set including one or more 2G/3G base stations belonging to a 2G/3G network, and standard information and frequency information respectively corresponding to the one or more 2G/3G base stations;

when the user equipment initiates, in a Long Term Evolution (LTE) network, a voice service, sending, by the user equipment, a CSFB request message to an LTE base station in the LTE network;

receiving, by the user equipment, a standard and a frequency of a target 2G/3G base station that are sent by the LTE base station;

determining, by the user equipment according to the standard and the frequency of the target 2G/3G base station, whether the 2G/3G base station candidate set includes the target 2G/3G base station;

when the 2G/3G base station candidate set includes the target 2G/3G base station, switching the user equipment from the LTE base station to the target 2G/3G base station according to the standard and the frequency of the target 2G/3G base station;

when the 2G/3G base station candidate set does not include the target 2G/3G base station, sending a resending request message to the LTE base station, wherein the resending request message is used to indicate to the LTE base station that the 2G/3G base station candidate set does not include the target 2G/3G base station; and after the LTE base station re-determines another target 2G/3G base station, and sends a standard and a frequency of the another target 2G/3G base station to the user equipment, determining, by the user equipment, whether the 2G/3G base station candidate set includes the another target 2G/3G base station, and when the 2G/3G base station candidate set does not include the another target 2G/3G base station, sending another resending request message to the LTE base station.

2. The CSFB switching method according to claim 1, wherein the acquiring the 2G/3G base station candidate set comprises:

detecting a base station in the 2G/3G network;

measuring a signal strength of the detected base station in the 2G/3G network;

receiving a standard and a frequency that correspond to the detected base station when the signal strength of the detected base station is greater than a preset threshold; and acquiring the 2G/3G base station candidate set according to the detected base station and according to the standard and the frequency that correspond to the detected base station when the signal strength of the detected base station is greater than the preset threshold.

3. The CSFB switching method according to claim 2, wherein the receiving the standard and the frequency of the detected base station comprises:

detecting a broadcast control channel of the detected base station; and receiving the standard and the frequency that are loaded onto the broadcast control channel by the detected base station, and the acquiring the 2G/3G base station candidate set comprises:

generating the 2G/3G base station candidate set according to the detected base station and according to the standard and the frequency that correspond to the detected base station; or sending information of the detected base station to a server, sending the standard and the frequency that correspond to the detected base station to the server, and receiving, by the user equipment, the 2G/3G base station candidate set sent by the server.

4. The CSFB switching method according to claim 1, wherein after the switching the user equipment from the LTE base station to the target 2G/3G base station according to the standard and the frequency of the target 2G/3G base station, the method further comprises:

acquiring, based on one or more respective signal strengths of the one or more 2G/3G base stations in the 2G/3G base station candidate set, a 2G/3G base station with a maximum signal strength in the 2G/3G base station candidate set; and switching the user equipment to the 2G/3G base station with the maximum signal strength according to a standard and a frequency corresponding to the 2G/3G base station with the maximum signal strength.

5. The CSFB switching method according to claim 4, wherein the switching the user equipment to the 2G/3G base station with the maximum signal strength according to the standard and the frequency corresponding to the 2G/3G base station with the maximum signal strength comprises:

determining whether the 2G/3G base station with the maximum signal strength is the target 2G/3G base station, and when the 2G/3G base station with the maximum signal strength is the target 2G/3G base station, continuing to connect to the target 2G/3G base station; or when the 2G/3G base station with the maximum signal strength is not the target 2G/3G base station, switching the user equipment from the target 2G/3G base station to the 2G/3G base station with the maximum signal strength.

6. The CSFB switching method according to claim 1, wherein the method further comprises:

before initiating the voice service, receiving a system message sent by the LTE base station, wherein the system message includes a base station record and a connection record of the user equipment, the base station record including standards and frequencies of first 2G/3G base stations at a current location of the user equipment, and the connection record including standards and frequencies of second 2G/3G base stations to which the user equipment has connected;

determining whether the connection record includes a 2G/3G base station from the first 2G/3G base stations at the current location of the user equipment; and at least one of the following operations, including when the connection record includes the 2G/3G base station from the first 2G/3G base stations at the current location of the user equipment, determining that the 2G/3G base station from the first 2G/3G base stations at the current location is the target 2G/3G base station; or when the connection record does not include any 2G/3G base station from the first 2G/3G base stations at the current location of the user equipment, determining a 2G/3G base station with a maximum signal strength from the first 2G/3G base stations to be the target 2G/3G base station.

7. The CSFB switching method according to claim 1, wherein after the user equipment ends a voice service in the 2G/3G network, the method further comprises:

determining whether the user equipment is in the idle mode;

when the user equipment is not in the idle mode,
sending a mode switching request message to a 2G/3G base station in the 2G/3G network,
receiving a mode switching instruction sent by the 2G/3G base station, and
switching to the idle mode according to the mode switching instruction; or when the user equipment is in the idle mode,
acquiring an LTE base station candidate set, wherein the LTE base station candidate set includes one or more LTE base stations, and standard information and frequency information respectively corresponding to the one or more LTE base stations,
acquiring, from the LTE base station candidate set, a target LTE base station to be switched to, and
switching the user equipment from the 2G/3G base station to the target LTE base station according to a standard and a frequency of the target LTE base station.

8. The CSFB switching method according to claim 7, wherein the acquiring the LTE base station candidate set comprises:
detecting an LTE base station in the LTE network;
measuring a signal strength of the detected LTE base station;
receiving a standard and a frequency that correspond to the detected LTE base station when the signal strength of the detected LTE base station is greater than a preset threshold; and
acquiring the LTE base station candidate set according to the detected LTE base station and according to the standard and the frequency that correspond to the detected LTE base station when the signal strength of the detected LTE base station is greater than the preset threshold.

9. The CSFB switching method according to claim 8, wherein
the receiving the standard and the frequency of the detected LTE base station comprises:
detecting a broadcast control channel of the detected LTE base station; and
receiving the standard and the frequency that are loaded by the detected LTE base station onto the broadcast control channel, and
the acquiring the LTE base station candidate set comprises:
generating the LTE base station candidate set according to the detected LTE base station and according to the standard and the frequency that correspond to the detected LTE base station; or
sending information of the detected LTE base station to a server, sending the standard and the frequency that correspond to the LTE base station to the server, and receiving the LTE base station candidate set sent by the server.

10. The CSFB switching method according to claim 7, wherein the acquiring, from the LTE base station candidate set, the target LTE base station comprises:
determining an LTE base station with a maximum signal strength in the LTE base station candidate set to be the target LTE base station.

11. User equipment, comprising:
a transmitting circuit configured to transmit outgoing wireless signals;
a receiving circuit configured to receive incoming wireless signals;
a memory configured to store software instructions; and
a processor that is respectively connected to the transmitting circuit, the receiving circuit, and the memory, wherein the processor is configured to execute the software instructions to cause the user equipment to perform following operations:
when the user equipment is in an idle mode, acquiring a 2nd/3rd generation mobile phone communications technology (2G/3G) base station candidate set, the 2G/3G base station candidate set including
one or more 2G/3G base stations belonging to a 2G/3G network, and
standard information and frequency information respectively corresponding to the one or more 2G/3G base stations;
when the user equipment initiates, in a Long Term Evolution (LTE) network, a voice service, sending, by the user equipment, a CSFB request message to an LTE base station in the LTE network;
receiving, by the user equipment, a standard and a frequency of a target 2G/3G base station that are sent by the LTE base station;
determining, by the user equipment according to the standard and the frequency of the target 2G/3G base station, whether the 2G/3G base station candidate set includes the target 2G/3G base station;
when the 2G/3G base station candidate set includes the target 2G/3G base station, switching the user equipment from the LTE base station to the target 2G/3G base station according to the standard and the frequency of the target 2G/3G base station;
when the 2G/3G base station candidate set does not include the target 2G/3G base station, sending a resending request message to the LTE base station, wherein the resending request message is used to indicate to the LTE base station that the 2G/3G base station candidate set does not include the target 2G/3G base station; and
after the LTE base station re-determines another target 2G/3G base station, and sends a standard and a frequency of the another target 2G/3G base station to the user equipment, determining, by the user equipment, whether the 2G/3G base station candidate set includes the another target 2G/3G base station, and when the 2G/3G base station candidate set does not include the another target 2G/3G base station, sending another resending request message to the LTE base station.

12. The user equipment according to claim 11, wherein the processor is configured to execute the software instructions to cause the user equipment to perform following operations:
detecting a base station in the 2G/3G network;
measuring a signal strength of the detected base station in the 2G/3G network;
receiving a standard and a frequency that correspond to the detected base station when the signal strength of the detected base station is greater than a preset threshold; and
acquiring the 2G/3G base station candidate set according to the detected base station and according to the standard and the frequency that correspond to the detected base station when the signal strength of the detected base station is greater than the preset threshold.

13. The user equipment according to claim 11, wherein the processor is configured to execute the software instructions to cause the user equipment to perform the following operations:
acquiring, based on one or more respective signal strengths of the one or more 2G/3G base stations in the 2G/3G base station candidate set, a 2G/3G base station with a maximum signal strength in the 2G/3G base station candidate set; and switching the user equipment to the 2G/3G base station with the maximum signal strength according to a standard and a frequency corresponding to the 2G/3G base station with the maximum signal strength.

14. The user equipment according to claim 13, wherein the processor is configured to execute the software instructions to cause the user equipment to perform the following operations:

determining whether the 2G/3G base station with the maximum signal strength is the target 2G/3G base station, and when the 2G/3G base station with the maximum signal strength is the target 2G/3G base station, continuing to connect to the target 2G/3G base station; or when the 2G/3G base station with the maximum signal strength is not the target 2G/3G base station, switching the user equipment from the target 2G/3G base station to the 2G/3G base station with the maximum signal strength.

15. The user equipment according to claim 11, wherein the processor is configured to execute the software instructions to cause the user equipment to perform the following operations:

determining whether the user equipment is in the idle mode;

when the user equipment is not in the mode,
sending a mode switching request message to a 2G/3G base station in the 2G/3G network,
receiving a mode switching instruction sent by the 2G/3G base station, and
switching to the idle mode according to the mode switching instruction; or when the user equipment is in the idle mode,
acquiring an LTE base station candidate set, wherein the LTE base station candidate set includes one or more LTE base stations, and standard information and frequency information respectively corresponding to the one or more LTE base stations, acquiring, from the LTE base station candidate set, a target LTE base station to be switched to, and switching the user equipment from the 2G/3G base station to the target LTE base station according to a standard and a frequency of the target LTE base station.

16. The user equipment according to claim 15, wherein the processor is configured to execute the software instructions to cause the user equipment to perform the following operations:

detecting an LTE base station in the LTE network;

measuring a signal strength of the detected LTE base station;

receiving a standard and a frequency that correspond to the detected LTE base station when the signal strength of the detected LTE base station is greater than a preset threshold; and acquiring the LTE base station candidate set according to the detected LTE base station and according to the standard and the frequency that correspond to the detected LTE base station when the signal strength of the detected LTE base station is greater than the preset threshold.

17. The user equipment according to claim 15, wherein the processor is configured to execute the software instructions to cause the user equipment to perform the following operation:

determining an LTE base station with a maximum signal strength in the LTE base station candidate set to be the target LTE base station.

* * * * *